US009816839B2

(12) United States Patent
Murakami

(10) Patent No.: US 9,816,839 B2
(45) Date of Patent: Nov. 14, 2017

(54) STROKE SENSOR SYSTEM

(71) Applicant: Showa Corporation, Gyoda-shi (JP)

(72) Inventor: Yosuke Murakami, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 78 days.

(21) Appl. No.: 14/836,319

(22) Filed: Aug. 26, 2015

(65) Prior Publication Data

US 2016/0265943 A1    Sep. 15, 2016

(30) Foreign Application Priority Data

Mar. 10, 2015  (JP) .................................. 2015-047717

(51) Int. Cl.
*G01D 5/20* (2006.01)
*B62J 99/00* (2009.01)

(52) U.S. Cl.
CPC .............. *G01D 5/202* (2013.01); *B62J 99/00* (2013.01); *B62J 2099/002* (2013.01)

(58) Field of Classification Search
USPC .... 324/207.16, 207.15, 207.13, 207.11, 200, 324/207.25; 701/1, 117; 152/416;
(Continued)

(56) References Cited

U.S. PATENT DOCUMENTS 5,172,298 A    12/1992  Shimizu et al.
5,959,572 A *   9/1999  Higashimata ...... B60K 31/0008
                                                  340/903

(Continued)

FOREIGN PATENT DOCUMENTS

EP          0145290 A      6/1985
GB          2089515 A      6/1982
WO     WO-2013/066158 A    5/2013

OTHER PUBLICATIONS

Alexander Russell, Inductive Displacement Transducers, Dec. 4, 1981, UK Patent Application, GB 2089515 A, G01B7/10.*

(Continued)

*Primary Examiner* — Melissa Koval
*Assistant Examiner* — Nasima Monsur
(74) *Attorney, Agent, or Firm* — Leason Ellis LLP

(57) ABSTRACT

A stroke sensor system includes a tubular vehicle-body-side member, a tubular vehicle-wheel-side member, and a displacement obtainer. The tubular vehicle-body-side member is disposed at a vehicle body side. The tubular vehicle-wheel-side member is coupled to the vehicle-body-side member on a vehicle wheel side and movable in an axial direction of the vehicle-body-side member relative to the vehicle-body-side member. At least one of the members is a conductor. Another one of the members includes a coil. The displacement obtainer includes a capacitor electrically coupled to the coil and constituting an LC oscillation circuit that outputs an oscillation waveform when the members move relative to each other. The displacement obtainer digitizes the oscillation waveform to obtain a reshaped waveform, divides a frequency of the reshaped waveform by a frequency division ratio to obtain a frequency-divided waveform, and uses the frequency-divided waveform to obtain a displacement by which the members move relative to each other.

14 Claims, 12 Drawing Sheets

(58) Field of Classification Search
USPC .......................................... 180/170; 318/128; 340/988
See application file for complete search history.

(56) References Cited

U.S. PATENT DOCUMENTS

| | | | |
|---|---|---|---|
| 6,173,801 B1 * | 1/2001 | Kakutani | ................. B62M 6/40 180/206.3 |
| 2001/0004849 A1 * | 6/2001 | Jin | ....................... G01D 5/2451 73/862.331 |

OTHER PUBLICATIONS

Extended European Search Report mailed Jul. 11, 2015 for the corresponding European Patent Application No. 15182843.1.

* cited by examiner

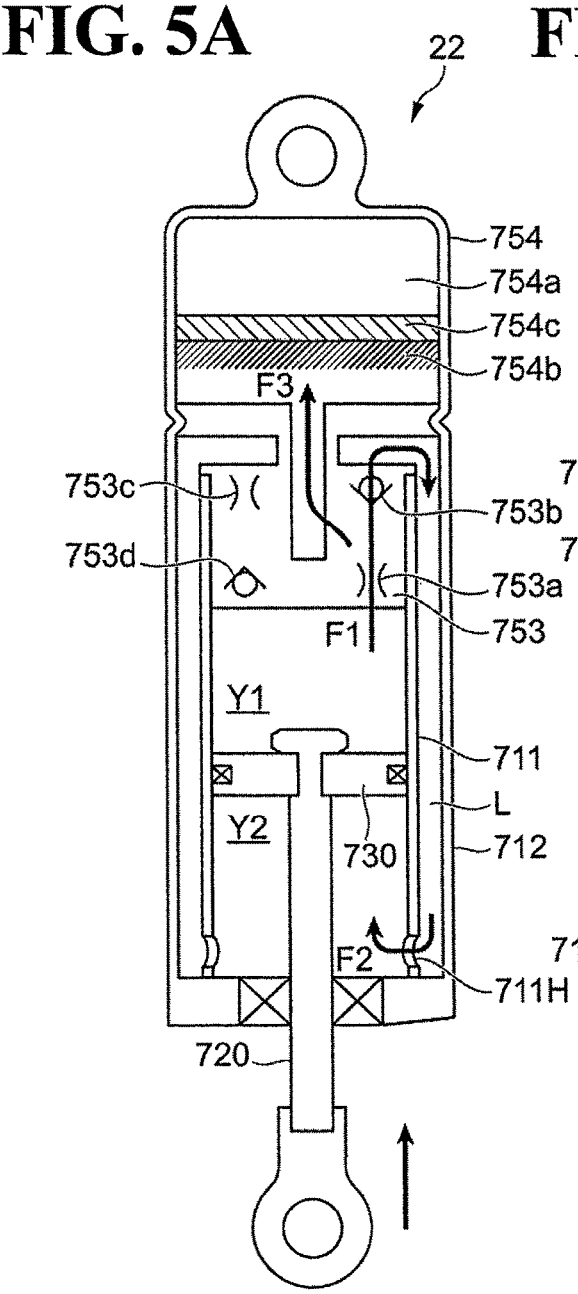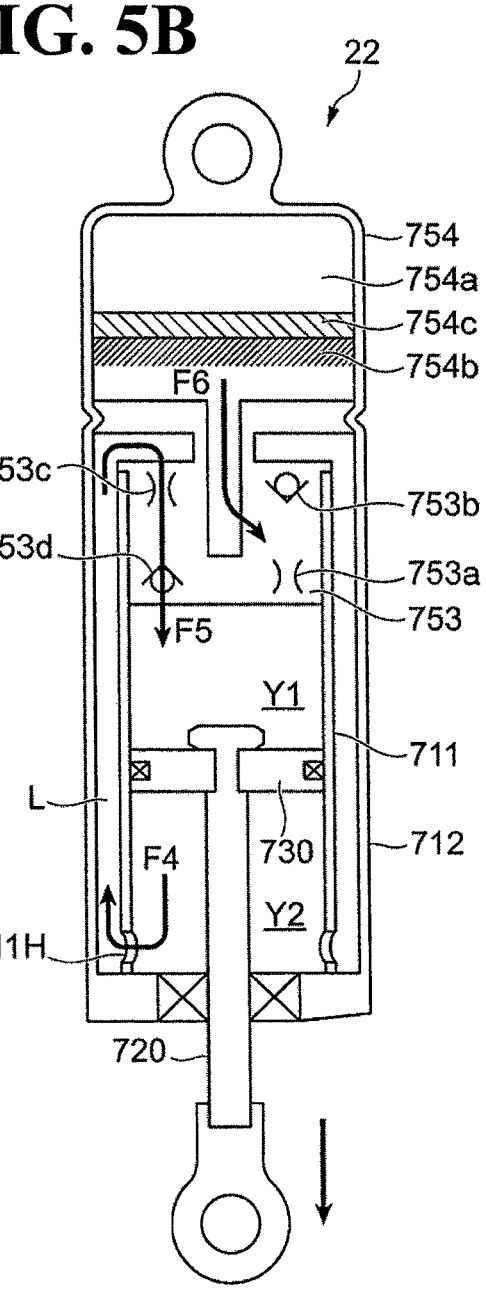

Oscillation waveform

Reshaped waveform

Divided waveform

STROKE SENSOR SYSTEM

CROSS-REFERENCE TO RELATED APPLICATIONS

The present application claims priority under 35 U.S.C. §119 to Japanese Patent Application No. 2015-047717, filed Mar. 10, 2015. The contents of this application are incorporated herein by reference in their entirety.

BACKGROUND OF THE INVENTION

Field of the Invention

The present invention relates to a stroke sensor system.

Discussion of the Background

Motorcycles and other similar vehicles are each equipped with a suspension.

While the vehicle is running, vibrations are transmitted from the ground surface to the body of the vehicle, and the suspension alleviates the vibrations to appropriate levels that provide improved ride comfortability and handling stability. The suspension is equipped with a stroke sensor to keep track of the amount of stroke.

WO 2013/066158 discloses a suspension assembly that includes an inner tube, an outer tube, an electrically insulating cover, an alternating-current (AC) source, a detector, and a processing unit. The inner tube and the outer tube make a telescopic movement with respect to each other. The electrically insulating cover is stationarily arranged with respect to one of the inner tube and the outer tube and is arranged to coaxially overlap the other tube of the inner tube and the outer tube. The electrically insulating cover includes an electrical coil. The AC source is connected to the electrical coil to form an electrical circuit. The detector detects a value of an electrical parameter of the electrical circuit, such as the current through or the voltage over the electrical coil. The processing unit determines the relative position of the inner tube and the outer tube using change in the value of the electrical parameter with respect to a known value of the electrical parameter at a predefined relative position of the inner tube and the outer tube.

Conventional examples of the stroke sensor include linear potentiometric sensors and rotary potentiometric sensors.

SUMMARY OF THE INVENTION

According to one aspect of the present disclosure, a stroke sensor system includes a tubular vehicle-body-side member, a tubular vehicle-wheel-side member, and a displacement obtainer. The tubular vehicle-body-side member is disposed at a side of a body of a vehicle. The tubular vehicle-wheel-side member is coupled to the vehicle-body-side member at a side of a wheel of the vehicle and movable in an axial direction of the vehicle-body-side member relative to the vehicle-body-side member. At least one member among the vehicle-body-side member and the vehicle-wheel-side member is a conductor. Another member among the vehicle-body-side member and the vehicle-wheel-side member includes a coil. The displacement obtainer includes a capacitor that is electrically coupled to the coil and that constitutes an LC oscillation circuit configured to output an oscillation waveform when the vehicle-wheel-side member moves relative to the vehicle-body-side member. The displacement obtainer is configured to digitize the oscillation waveform so as to obtain a reshaped waveform, configured to divide a frequency of the reshaped waveform by a predetermined frequency division ratio so as to obtain a frequency-divided waveform, and configured to use the frequency-divided waveform to obtain a displacement by which the vehicle-wheel-side member moves relative to the vehicle-body-side member.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 5A and 5B schematically illustrate how the rear suspension moves;

DESCRIPTION OF THE EMBODIMENTS

Figure 1:
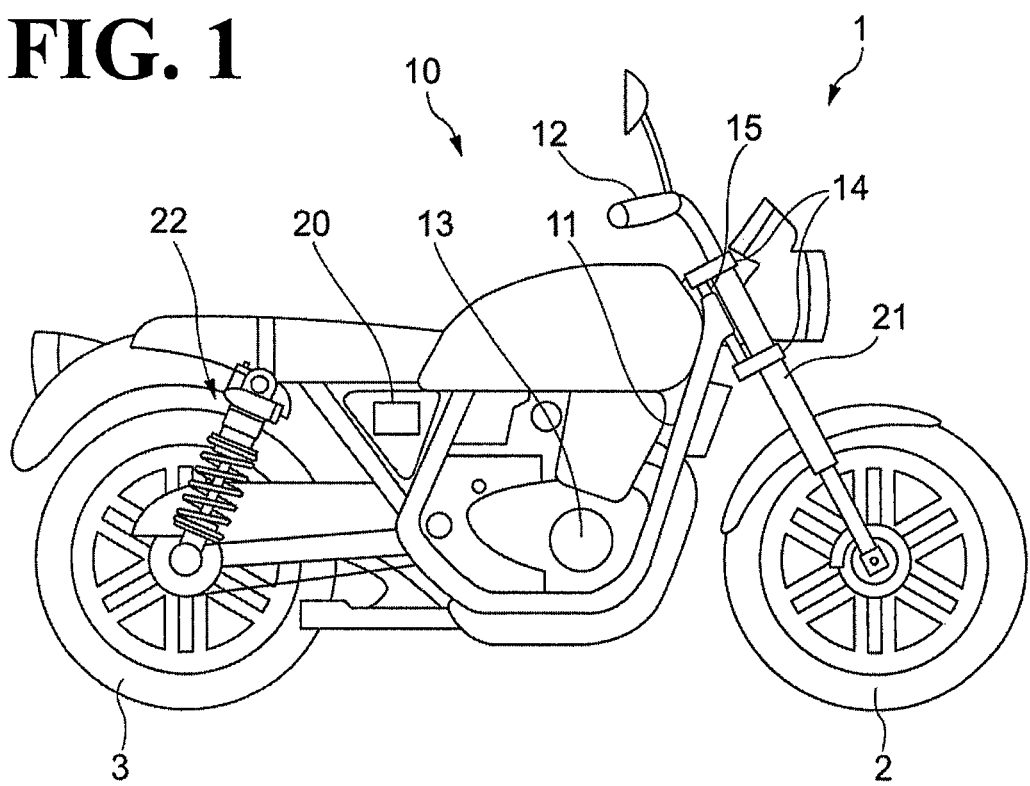
FIG. 1 illustrates a schematic configuration of a motorcycle according to an embodiment.

The embodiments will now be described with reference to the accompanying drawings, wherein like reference numerals designate corresponding or identical elements throughout the various drawings.

General Configuration of Motorcycle

FIG. 1 illustrates a schematic configuration of a motorcycle 1 according to this embodiment.

The motorcycle 1 includes a front wheel 2, a rear wheel 3, and a body 10. The front wheel 2 is a front side wheel. The rear wheel 3 is a rear side wheel. The body 10 includes a body frame 11, a handle 12, an engine 13, and other elements. The body frame 11 is a frame of the motorcycle 1.

The motorcycle 1 also includes front forks 21 to couple the front wheel 2 and the body 10 to each other. One of the front forks 21 is disposed at the left side of the front wheel 2, and the other front fork 21 is disposed at the right side of the front wheel 2. The motorcycle 1 also includes rear suspensions 22 to couple the rear wheel 3 and the body 10 to each other. One of the rear suspensions 22 is disposed at the left side of the rear wheel 3, and the other rear suspension 22 is disposed at the right side of the rear wheel 3. FIG. 1 illustrates the right-side front fork 21 and the right-side rear suspension 22.

The motorcycle 1 also includes two brackets 14 and a shaft 15. The brackets 14 hold the front fork 21 disposed at the left side of the front wheel 2 and the front fork 21 disposed at the right side of the front wheel 2. The shaft 15 is disposed between the brackets 14. The shaft 15 is rotatably supported on the body frame 11.

The motorcycle 1 also includes a controller 20. The controller 20 controls a solenoid 310 of a passage switch unit 300, described later, of the front forks 21 so as to control the height of the motorcycle 1.

Configuration and Functions of Rear Suspension 22

Figure 2:
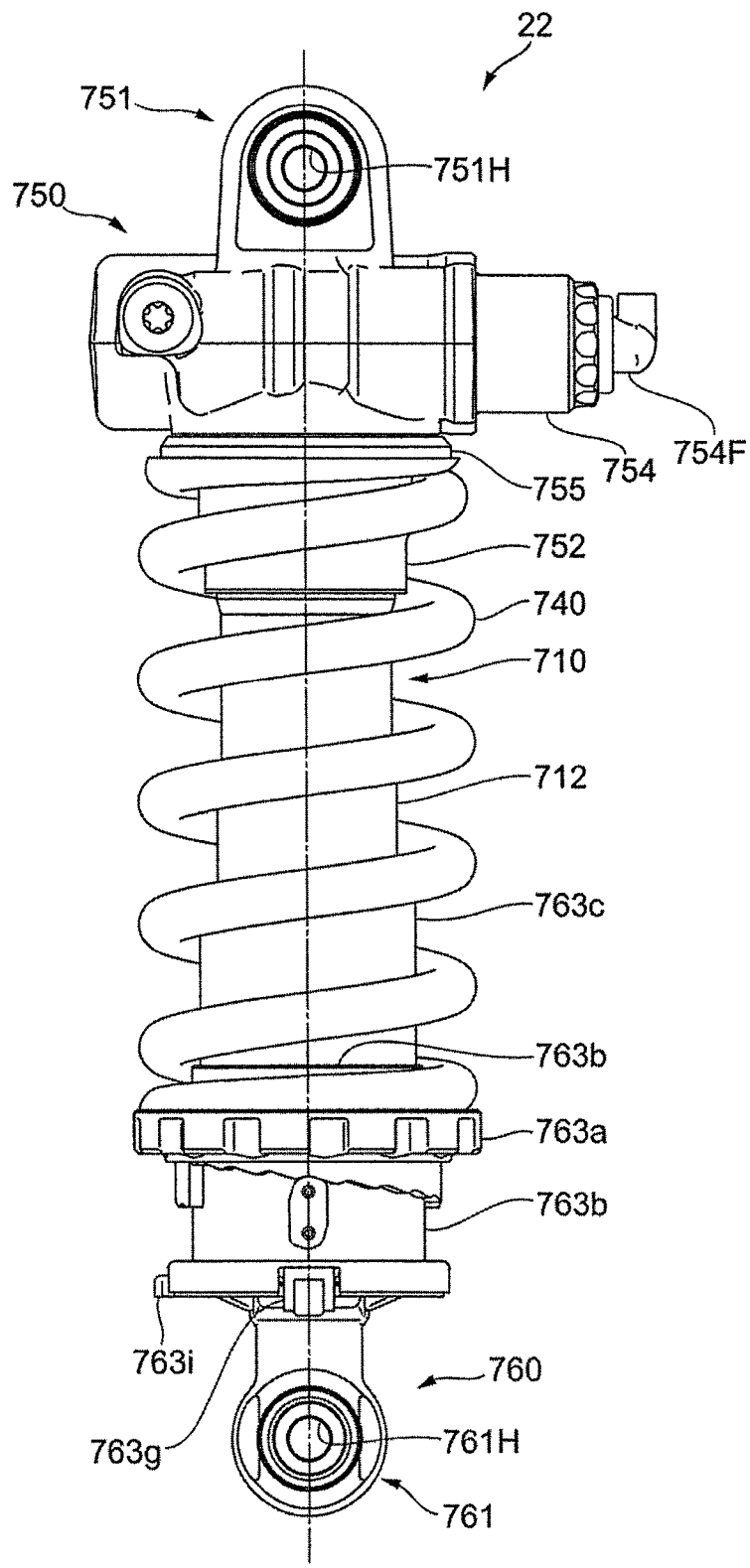
FIG. 2 illustrates an external appearance of a rear suspension according to this embodiment.

FIG. 2 illustrates an external appearance of one rear suspension 22 according to this embodiment.

Figure 3:
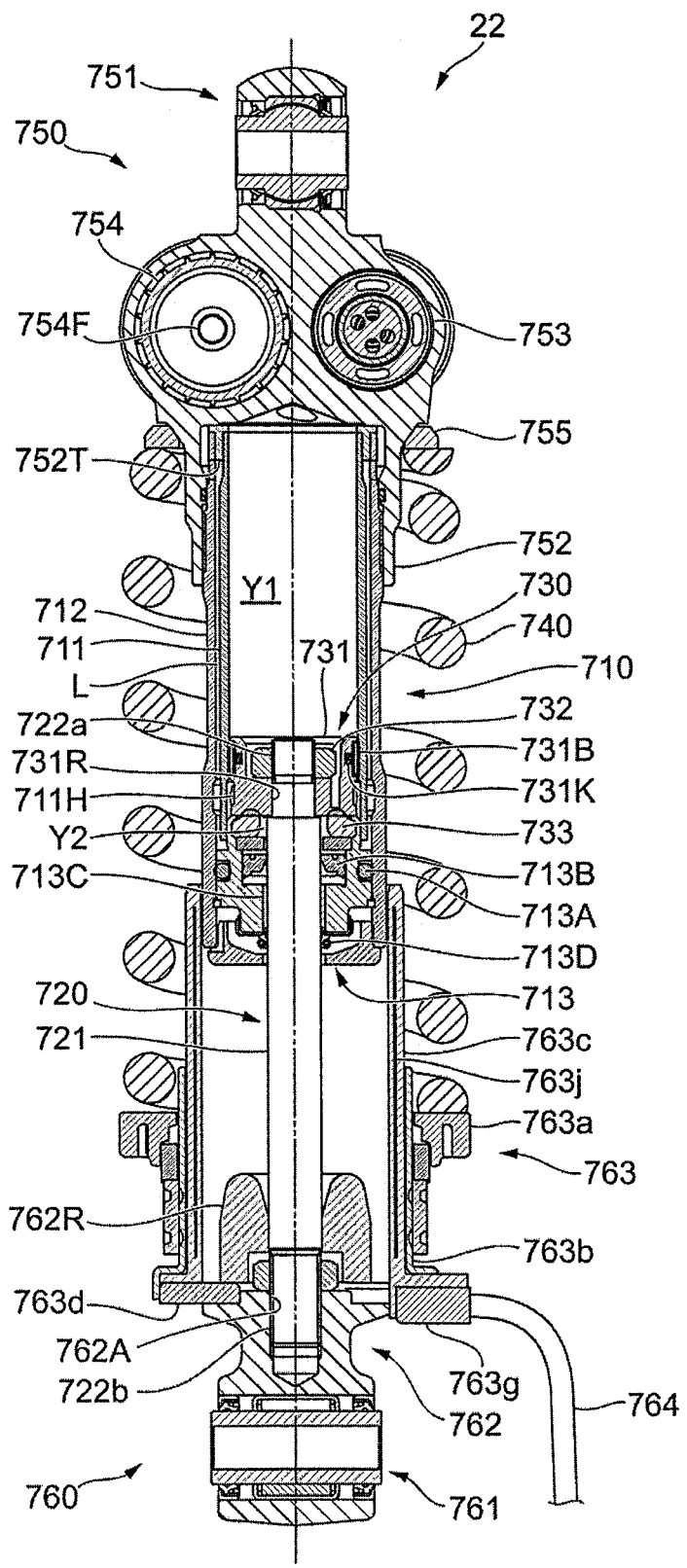
FIG. 3 is a cross-sectional view of the rear suspension illustrated in FIG. 2.

FIG. 3 is a cross-sectional view of the rear suspension 22 illustrated in FIG. 2.

The rear suspension 22 includes a cylinder unit 710, a piston rod 720, a piston 730, a coil spring 740, a vehicle-body-side mounting member 750, and a vehicle-wheel-side mounting member 760.

Configuration of Cylinder Unit 710

The cylinder unit 710 includes a cylinder 711 and an outer cylinder 712. The outer cylinder 712 is disposed at the outside of the cylinder 711. The cylinder 711 and the outer cylinder 712 are concentric (coaxial) cylinders.

The cylinder unit 710 also includes a rod guide 713 at the lower-side end of the cylinder unit 710.

In the following description, an axial direction of the outer cylinder 712 will be referred to simply as "vertical direction". In the drawing of FIG. 3, the lower side in the vertical direction of the outer cylinder 712 is the rear wheel 3 side (which is the wheel side and the axle side), and will occasionally be referred to as "lower side". Also in the drawing of FIG. 3, the upper side in the vertical direction of the outer cylinder 712 is the body 10 side (which is the vehicle body side and the main body side), and will occasionally be referred to as "upper side".

The cylinder 711 is a thin, hollow cylindrical member, and contains oil. On the inner surface of the cylinder 711, the piston 730 is slidable in the vertical direction. Specifically, the piston 730 moves with its outer circumference in contact with the inner circumference of the cylinder 711.

The cylinder 711 has a cylinder opening 711H at the lower-side end of the cylinder 711 and on the upper side of the rod guide 713.

The outer cylinder 712 is a thin, hollow cylindrical member disposed at the outside of the cylinder 711 with a predetermined gap between the outer circumference of the cylinder 711 and the inner circumference outer cylinder 712. The outer cylinder 712 and the cylinder 711 define a conduit L for the oil inside the cylinder 711 to flow between the cylinder 711 and an attenuation force generator 753, described later.

The outer cylinder 712 functions as the tubular vehicle-body-side member, which is disposed at the body side. The outer cylinder 712 is made of a conductor such as aluminum.

The cylinder 711 and the outer cylinder 712 have their respective ends on the upper side in the vertical direction mounted on the vehicle-body-side mounting member 750. An exemplary manner of mounting the cylinder 711 to the vehicle-body-side mounting member 750 is to insert the cylinder 711 under pressure into the vehicle-body-side mounting member 750. An exemplary manner of mounting the outer cylinder 712 to the vehicle-body-side mounting member 750 is to engage a female thread formed on the vehicle-body-side mounting member 750 with a male thread formed on the outer cylinder 712.

The rod guide 713 is generally a thick, hollow cylindrical member held on the inner surface of the outer cylinder 712. The rod guide 713 is also secured in vertical direction to the lower-side end of the outer cylinder 712 through an O ring 713A. With this configuration, the rod guide 713 covers the ends of the cylinder 711 and the outer cylinder 712 on the lower side in vertical direction.

The rod guide 713 also holds the piston rod 720 on the inner hole of the rod guide 713 through an oil seal 713B, a bush 713C, and a dust seal 713D, and movably supports the piston rod 720.

Configuration of Piston Rod 720

The piston rod 720 extends in the vertical direction and is coupled to the piston 730 at the upper-side end of the piston rod 720 in the vertical direction.

The piston rod 720 is a solid or hollow bar-shaped member, and includes a rod unit 721, an upper side mounting portion 722a, and a lower side mounting portion 722b. The rod unit 721 has a solid cylindrical or hollow cylindrical shape. The upper side mounting portion 722a receives the piston 730 and other elements at the upper-side end of the upper side mounting portion 722a in the vertical direction. At the lower-side end of the lower side mounting portion 722b in the vertical direction, the lower side mounting portion 722b mounts the piston rod 720 to the vehicle-wheel-side mounting member 760. The upper side mounting portion 722a and the lower side mounting portion 722b have male threads defined by spiral grooves formed on the outer surfaces of the ends of the upper side mounting portion 722a and the lower side mounting portion 722b. The male threads function as bolts.

Configuration of Piston 730

The piston 730 includes a piston body 731, a nut 732, and a rebound rubber 733. The nut 732 is for the piston body 731 to be mounted on the upper side mounting portion 722a of the piston rod 720.

The piston 730 is movable in the cylinder 711 in the vertical direction, and defines a first oil chamber Y1 and a second oil chamber Y2 in the space inside the cylinder 711. The first oil chamber Y1 and the second oil chamber Y2 contain oil.

The piston body 731 includes an mounting hole 731R, a bush 731B, and an O ring 731K. The mounting hole 731R is formed in the vertical direction to allow the upper side mounting portion 722a of the piston rod 720 to pass through the mounting hole 731R. The bush 731B is for the piston body 731 to slide in the cylinder 711 in the vertical direction. The O ring 731K keeps the first oil chamber Y1 and the second oil chamber Y2 liquid tight.

When the cylinder unit 710 is in its fully extended state at the time of a rebound stroke, the rebound rubber 733 absorbs the impact of contact between the upper-side end of the rod guide 713 and the piston 730. Thus, the rebound rubber 733 eliminates or minimizes damage to the piston 730 and the rod guide 713.

Configuration of Coil Spring 740

The coil spring 740 is expandable and contractable to absorb vibrations transmitted to the rear wheel 3 due to the roughness of a ground surface. That is, the coil spring 740 functions as the elastic member configured to absorb a vibration between the body and the wheel.

The coil spring 740 has its end on the upper side in the vertical direction in contact with a spring receiver 755, described later. Thus, the position of the upper-side end of the coil spring 740 in the vertical direction is defined. Also, the coil spring 740 has its end on the lower side in the vertical direction in contact with a spring adjustor 763a, described later. Thus, the position of the lower-side end of the coil spring 740 in the vertical direction is defined.

Configuration of Body-Side Mounting Member 750

The vehicle-body-side mounting member 750 includes a vehicle-body-side coupling member 751, a cylinder-unit fitting portion 752, the attenuation force generator 753, a subsidiary tank 754, and the spring receiver 755.

The vehicle-body-side coupling member 751 has a coupling hole 751H for a mounting member (not illustrated) disposed at the body 10 side to be inserted into the coupling hole 751H. Thus, the rear suspensions 22 are mounted on the body 10 side.

In the cylinder-unit fitting portion 752, the cylinder 711 and the outer cylinder 712 of the cylinder unit 710 are fitted. The cylinder-unit fitting portion 752 has an approximately hollow cylindrical shape and has an inner surface along the outer surface of the outer cylinder 712. The outer cylinder 712 is screwed into the cylinder-unit fitting portion 752. The cylinder-unit fitting portion 752 also has a protrusion 752T on the upper-side bottom of the cylinder-unit fitting portion 752. The protrusion 752T keeps the cylinder 711 and the outer cylinder 712 liquid tight. The cylinder 711 is inserted under pressure into the cylinder-unit fitting portion 752 against the inner surface of the protrusion 752T.

The attenuation force generator 753 generates attenuation force when the cylinder 711 and the piston rod 720 move relative to each other, which will be detailed later. The attenuation force generator 753 has an attenuation valve inside the attenuation force generator 753. The attenuation valve causes a resistance to occur against the oil flow, thereby generating the attenuation force.

The subsidiary tank 754 has an air chamber 754a and an oil storage chamber 754b defined inside the subsidiary tank 754 by a bladder 754c, which will be detailed later. Air is injectable into the air chamber 754a through an air valve 754F to pressurize the air chamber 754a.

In a rebound stroke, the cylinder 711 and the piston rod 720 move in directions away from each other. This decreases the volume that the piston rod 720 occupies in the cylinder 711. The decrease in volume necessitates a supply of oil into the cylinder 711, in order to fill the decrease in volume. Specifically, the amount of oil is adjusted by using the pressure of the air chamber 754a to send oil to the first oil chamber Y1 through the bladder 754c.

In a compression stroke, the cylinder 711 and the piston rod 720 move in directions toward each other. This increases the volume that the piston rod 720 occupies in the cylinder 711. The increase in volume necessitates discharging oil out of the cylinder 711, in order to make room for the increase in volume. Specifically, the amount of oil is adjusted by sending oil to the oil storage chamber 754b.

The spring receiver 755 defines the position of the upper-side end of the coil spring 740, as described above.

Configuration of Vehicle-Wheel-Side Mounting Member 760

The vehicle-wheel-side mounting member 760 includes a vehicle-wheel-side coupling member 761, a piston-rod fitting portion 762, a load adjustor 763, and a signal line 764.

The vehicle-wheel-side coupling member 761 has a coupling hole 761H. The axle of the rear wheel 3 is inserted through the coupling hole 761H, and thus the rear suspension 22 is mounted on the axle.

The piston-rod fitting portion 762 has a depression 762A. The depression 762A is fitted with the piston rod 720. On the inner surface of the depression 762A, a female thread is formed that receives a male thread formed on the outer surface of the lower side mounting portion 722b of the piston rod 720. Thus, the piston rod 720 is held.

The piston-rod fitting portion 762 includes an approximately ring-shaped bump rubber 762R. When the cylinder unit 710 is in its fully compressed state at the time of a compression stroke, the bump rubber 762R absorbs the impact of contact between the lower-side end of the rod guide 713 and the vehicle-wheel-side mounting member 760. Thus, the bump rubber 762R eliminates or minimizes damage to the rod guide 713 and other elements.

The load adjustor 763 is a mechanism section to adjust the position of the spring receiver in the vertical direction, and is used to adjust the length of the coil spring 740. This ensures adjustment of the vehicle height and the initial load (preload) of the coil spring 740.

Figure 4:
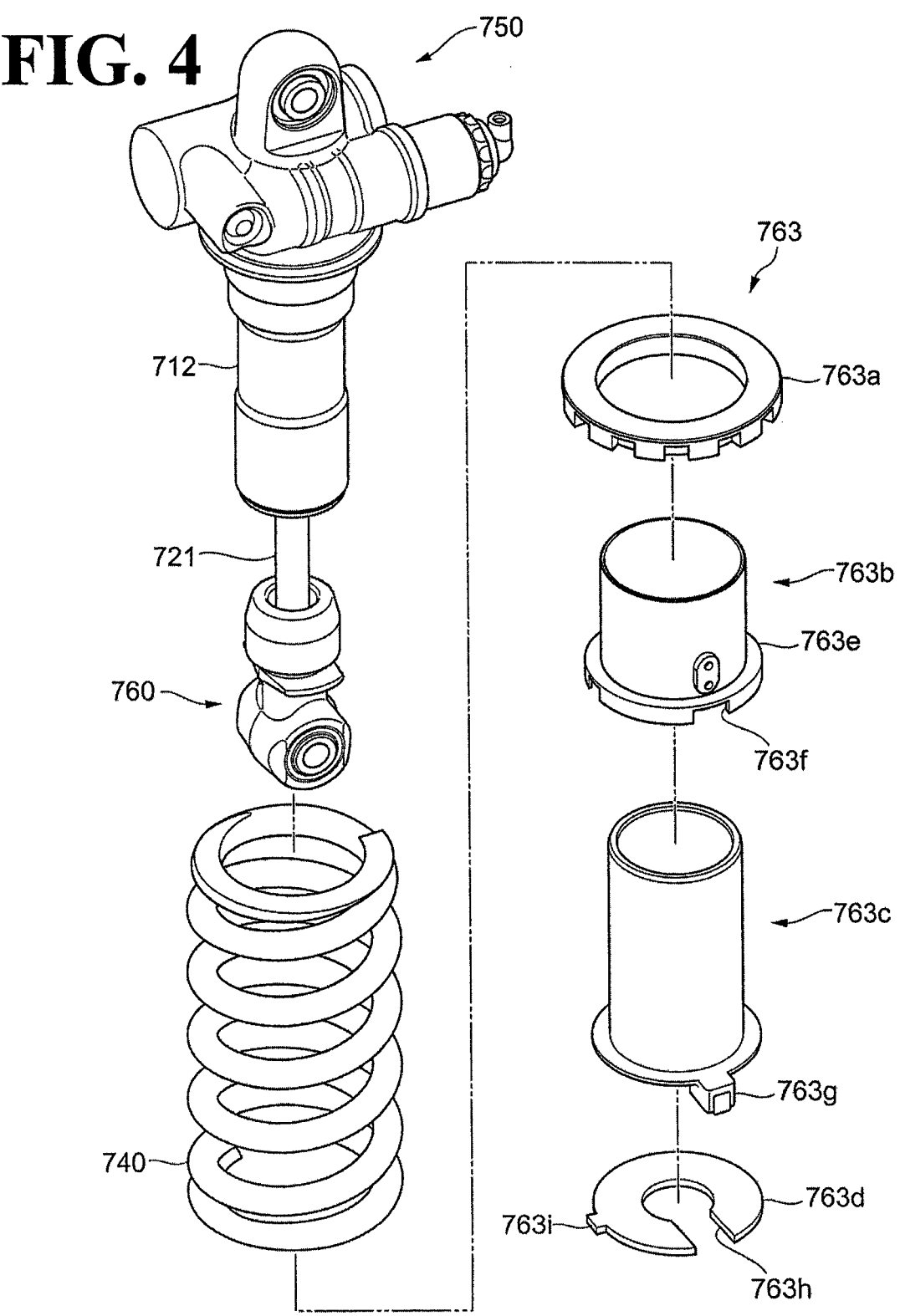
FIG. 4 illustrates a configuration of a load adjustor.

FIG. 4 illustrates a configuration of the load adjustor 763.

The load adjustor 763 includes the spring adjustor 763a, a spring receiver aid member 763b, a guide 763c, and a spring reception member 763d.

These four elements are assembled in the manner illustrated in FIG. 4 into the load adjustor 763. The spring receiver aid member 763b includes an expanded tube portion 763e at the lower-side end of the spring receiver aid member 763b. The expanded tube portion 763e includes a plurality of cutout portions 763f over the circumference of the expanded tube portion 763e. The guide 763c includes a protrusion 763g. The protrusion 763g protrudes in a direction orthogonal to the vertical direction. The guide 763c is inserted into the spring receiver aid member 763b, and thus the protrusion 763g is brought into engagement with a cutout portion 763f. Thus, the spring receiver aid member 763b and the guide 763c are assembled. The spring reception member 763d includes a cutout portion 763h. The protrusion 763g and the cutout portion 763h are brought into engagement with each other, and thus the guide 763c and the spring reception member 763d are assembled. The spring reception member 763d includes a protrusion 763i. A cutout portion 763f and the protrusion 763i are brought into engagement with each other, and thus the spring receiver aid member 763b and the spring reception member 763d are assembled.

The spring adjustor 763a has an approximately ringed shape and has an upper side surface in contact with the coil spring 740. The spring adjustor 763a rotates to adjust its position in the vertical direction, and thus adjusts the position of the coil spring 740 on the lower side. In this manner, the spring adjustor 763a adjusts the length of the coil spring 740.

The spring receiver aid member 763b has an approximately hollow cylindrical shape, and transmits the force acting from the coil spring 740 to the spring reception member 763d.

The guide 763c has an approximately hollow cylindrical shape, and is made of resin or similar material. The guide 763c protects the piston rod 720, that is, serves as a protector to protect the piston rod 720 from incoming stones and other objects. Without the guide 763c, the piston rod 720 would be damaged, and this may make the oil seal more likely to be broken. If the oil seal is broken, a leakage of oil may occur to the detriment of movement of the rear suspension 22.

The guide 763c covers the entire exposed portion of the piston rod 720 on the lower side in the vertical direction. The guide 763c and the outer cylinder 712 move relative to each other with the inner circumference of the guide 763c and the outer circumference of the outer cylinder 712 in contact with each other. The guide 763c has a tubular shape, is positioned on the rear wheel 3 side, and is coupled to the outer cylinder 712. With this configuration, the guide 763c functions as a vehicle-wheel-side member that moves in the vertical direction of the outer cylinder 712 relative to the outer cylinder 712.

The guide 763c includes a coil 763j, which constitutes the stroke sensor system. The coil 763j will be detailed later.

The spring reception member 763d has an approximately ringed shape with the cutout portion 763h, as described above. That is, the spring reception member 763d has an approximately C shape. Together with the spring adjustor 763a and the spring receiver aid member 763b, the spring reception member 763d serves as a reception member to transmit the force acting from the coil spring 740 to the vehicle-wheel-side coupling member 761 side. The spring reception member 763d, on the inner circumference, is fitted with the piston-rod fitting portion 762, and on the outer circumference, is fitted in the expanded tube portion 763e of the spring receiver aid member 763b. This configuration ensures that the axis positions of the spring receiver aid member 763b and the guide 763c are defined, and that the coil spring 740 is secured. The spring reception member 763d may be mounted in the following non-limiting manner: fit the coil spring 740, the spring adjustor 763a, the spring receiver aid member 763b, and the guide 763c in this order with the outer cylinder 712 and the piston rod 720 from the lower side toward the upper side in the vertical direction; temporarily put the coil spring 740 into diminished state; and fit the spring reception member 763d with the outer cylinder 712 and the piston rod 720 in a direction orthogonal to the vertical direction. The cutout portion 763h makes the spring reception member 763d capable of receiving the piston rod 720; specifically, the piston rod 720 may be inserted into the spring reception member 763d through the cutout portion 763h. Then, extend the coil spring 740; fit the inner circumference of the spring reception member 763d with the vehicle-wheel-side coupling member 761; fit the outer circumference of the spring reception member 763d with the inner circumference of the expanded tube portion 763e of the spring receiver aid member 763b; and fit the protrusion 763i with the cutout portions 763f of the spring receiver aid member 763b.

The signal line 764 is coupled to the coil 763j, which is inside the guide 763c of the load adjustor 763, and brings the current through the coil 763j to outside the rear suspension 22. The coil 763j and the signal line 764 are electrically coupled to each other through the protrusion 763g. In a non-limiting embodiment, the signal line 764 may be coupled directly to the coil 763j at the protrusion 763g. In another non-limiting embodiment, it is possible to provide connectors (couplers) at the protrusion 763g to couple the signal line 764. Specifically, the connector of the signal line 764 may be put upward, from the lower side toward the upper side, to be fitted with the connector of the protrusion 763g.

That is, this embodiment utilizes the space defined by the cutout portion 763h of the spring reception member 763d to install the wiring for the electrical coupling between the coil 763j and the signal line 764. In cases where the space is not used, the coil 763j and the signal line 764 may not be electrically coupled to each other as readily because of interference by other members.

Movement of Rear Suspension 22

FIGS. 5A and 5B schematically illustrate how the rear suspension 22 moves.

In the rear suspension 22 according to this embodiment, the second oil chamber Y2 and the conduit L are coupled to each other through the cylinder opening 711H, which is disposed at the cylinder 711. The conduit L is also coupled to the first oil chamber Y1 through the attenuation force generator 753. The attenuation force generator 753 is coupled to the oil storage chamber 754b of the subsidiary tank 754.

FIG. 5A illustrates a compression stroke, in which the cylinder 711 and the piston rod 720 move in directions toward each other.

In the compression stroke, the piston rod 720 and the piston 730 move, for example, in the upper side direction in the drawing of FIG. 5A. The movement of the piston 730 causes the oil in the first oil chamber Y1 to flow into the attenuation force generator 753 as indicated by arrow F1. In the attenuation force generator 753, a compression check valve 753b opens and a compression attenuation valve 753a opens. The compression attenuation valve 753a is made up of a stack of approximately disk-shaped metal plates. The oil bends open the metal plates to pass through the compression attenuation valve 753a. Thus, the compression attenuation valve 753a causes a resistance to occur against the oil flow, thereby generating compression attenuation force. The oil past the compression check valve 753b flows into the conduit L, and then flows into the second oil chamber Y2 through the cylinder opening 711H as indicated by arrow F2.

Here, the piston rod 720 enters the second oil chamber Y2 and thus the volume in the cylinder 711 decreases. This results in an excess of oil. The excessive amount of oil is discharged into the oil storage chamber 754b of the subsidiary tank 754 as indicated by arrow F3. Here, the excessive oil flows into the oil storage chamber 754b against the pressure of the air chamber 754a on the bladder 754c.

FIG. 5B illustrates a rebound stroke, in which the cylinder 711 and the piston rod 720 move in directions away from each other.

In the rebound stroke, the piston rod 720 and the piston 730 move, for example, in the lower side direction in the drawing of FIG. 5B. The movement of the piston 730 causes the oil in the second oil chamber Y2 to flow into the conduit L through the cylinder opening 711H as indicated by arrow F4. Then, the oil in the conduit L flows into the attenuation force generator 753 as indicated by arrow F5. In the attenuation force generator 753, an extension check valve 753d opens and an extension attenuation valve 753c opens. The extension attenuation valve 753c has a configuration similar to the configuration of the compression attenuation valve 753a. With this configuration, the extension attenuation valve 753c causes a resistance to occur against the oil flow, thereby generating extension attenuation force. The oil past the extension check valve 753d flows into the first oil chamber Y1.

Here, the piston rod 720 withdraws out of the second oil chamber Y2 and thus the volume in the cylinder 711 increases. This results in a deficiency of oil. The deficient amount of oil is made up for by a supply of oil from the oil storage chamber 754b of the subsidiary tank 754 as indicated by arrow F6. Here, the pressure of the air chamber 754a on the bladder 754c causes the oil in the oil storage chamber 754b to be discharged.

Configuration and Functions of Front Fork 21

Next, the front fork 21 will be described in detail.

Figure 6:
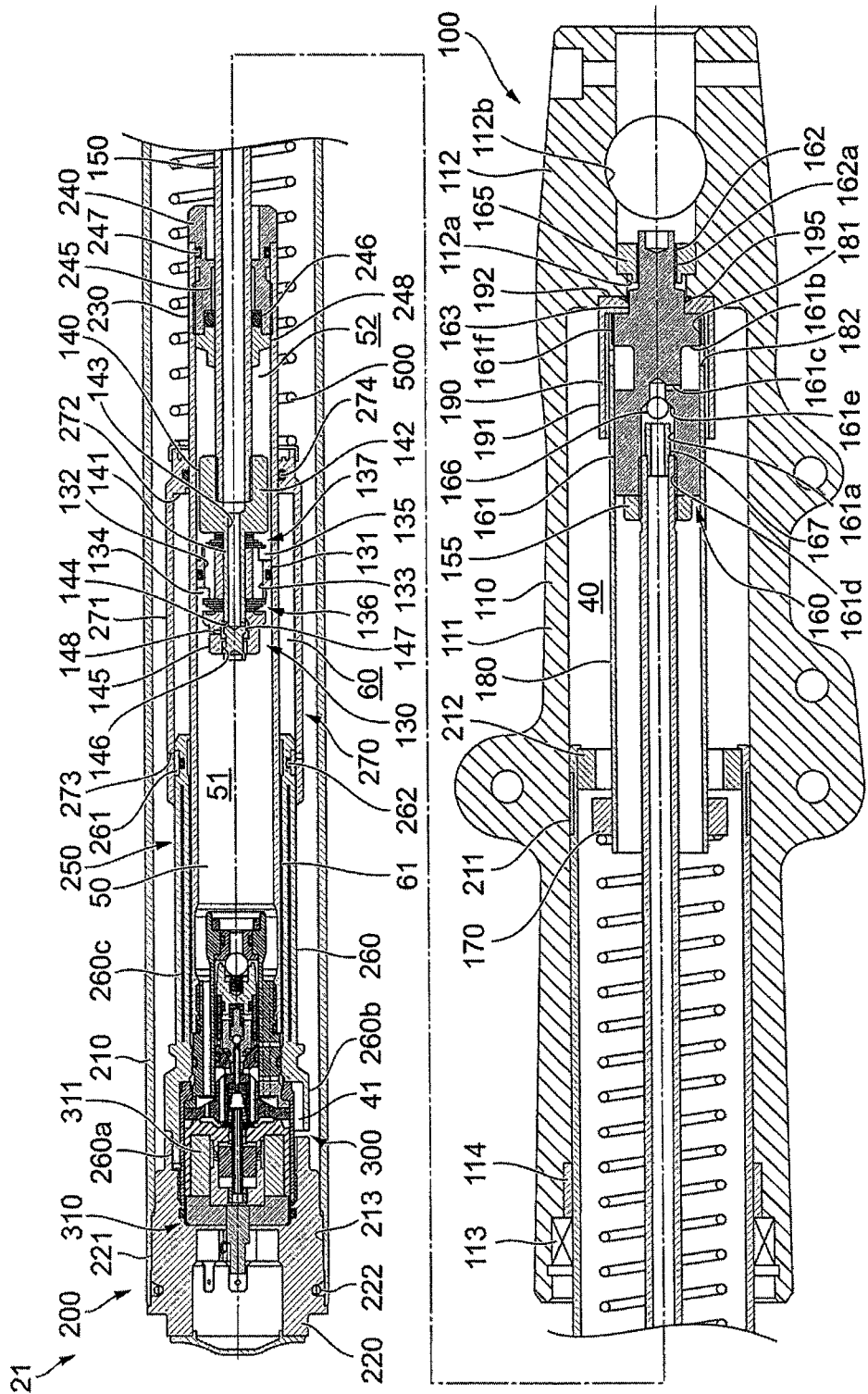
FIG. 6 is a cross-sectional view of a front fork according to the embodiment.

FIG. 6 is a cross-sectional view of one front fork 21 according to this embodiment.

The front fork 21 according to this embodiment is what is called an upright front fork. Specifically, the front fork 21 is disposed between the body 10 and the front wheel 2 of the motorcycle 1 to support the front wheel 2. The front fork 21 includes an outer member 110 and an inner tube 210. The outer member 110 is disposed at the front wheel 2 side of the front fork 21, and the inner tube 210 is disposed at the body 10 side of the front fork 21. The outer member 110 and the inner tube 210 will be described later.

The front fork 21 includes an axle side unit 100 and a body side unit 200. The axle side unit 100 includes the outer member 110 and is mounted on the axle of the front wheel 2. The body side unit 200 includes the inner tube 210 and is mounted on the body 10. The front fork 21 also includes a spring 500. The spring 500 is disposed between the axle side unit 100 and the body side unit 200 to absorb vibrations transmitted to the front wheel 2 due to the roughness of a ground surface.

The outer member 110 and the inner tube 210 are coaxial, hollow cylindrical members. A direction of the center line (that is, an axial direction) of each cylinder will be hereinafter occasionally referred to as "vertical direction". The body 10 side will occasionally be referred to the upper side, and the front wheel 2 side will occasionally be referred to as the lower side. By moving the axle side unit 100 and the body side unit 200 relative to each other in the vertical direction (axial direction), the front fork 21 absorbs vibrations caused by the roughness of a ground surface while supporting the front wheel 2.

Configuration of Axle Side Unit 100

The axle side unit 100 includes the outer member 110, an attenuation force generation unit 130, a rod 150, and a rod holding member 160. The outer member 110 is mounted on the axle of the front wheel 2. The attenuation force generation unit 130 generates attenuation force utilizing viscous resistance of oil. The rod 150 holds the attenuation force generation unit 130. The rod holding member 160 holds the lower-side end of the rod 150.

The axle side unit 100 also includes a ball 166 and a regulation member 167. The ball 166 has a spherical shape and is disposed in an axial depression 161*a*, described later, of the rod holding member 160. The regulation member 167 regulates the movement of the ball 166.

The axle side unit 100 also includes a spring support member 170, a support-member holding member 180, and a guide member 190. The spring support member 170 supports the lower-side end of the spring 500. The support-member holding member 180 holds the spring support member 170. The guide member 190 guides the inner tube 210 to move in the axial direction.

Configuration of Outer Member 110

The outer member 110 includes a hollow cylindrical portion 111 and an axle bracket 112. The hollow cylindrical portion 111 has a hollow cylindrical shape for the inner tube 210 to be inserted into the hollow cylindrical shape. The axle bracket 112 is mountable to the axle of the front wheel 2.

The hollow cylindrical portion 111, at its upper end, includes an oil seal 113 and a slide bush 114. The oil seal 113 seals the gap between the outer surface of the inner tube 210 and the hollow cylindrical portion 111. The slide bush 114 smoothens the sliding contact between the hollow cylindrical portion 111 and the outer surface of the inner tube 210.

The axle bracket 112 has an axial through hole 112*a* and an axle mounting hole 112*b*. The axial through hole 112*a* is oriented in the axial direction for the rod holding member 160 to be inserted through the axial through hole 112*a*. The axle mounting hole 112*b* penetrates the axle bracket 112 in a direction crossing the axial direction to receive the axle of the front wheel 2.

Configuration of Attenuation Force Generation Unit 130

The attenuation force generation unit 130 includes a piston 131, an upper-end side valve 136, and a lower-end side valve 137. The piston 131 defines an operating oil chamber 50, which is formed in the space inside a cylinder 230, described later. The upper-end side valve 136 is disposed at the upper-side end of the piston 131. The lower-end side valve 137 is disposed at the lower-side end of the piston 131. The attenuation force generation unit 130 also includes a piston bolt 140 and a nut 145. The piston bolt 140 supports the piston 131, the upper-end side valve 136, the lower-end side valve 137, and other members. The nut 145 is screwed on the piston bolt 140 to determine the positions of the piston 131, the upper-end side valve 136, the lower-end side valve 137, and other members.

The piston 131 is a hollow cylindrical member and has on its outer surface a seal member sealing the gap between the cylinder 230 and the piston 131. The piston 131 also has a first through hole 132 and a second through hole 133, which are through holes open in the axial direction. The piston 131 includes first radial conduits 134 and second radial conduits 135. The first radial conduits 134 radially extend at the upper-side end of the piston 131 and communicate with the first through hole 132. The second radial conduits 135 radially extend at the lower-side end of the piston 131 and communicate with the second through hole 133. A non-limiting example of the number of each of the first through holes 132 and the second through holes 133 is three. The three first through holes 132 and the three second through holes 133 are each disposed at equal intervals in a circumferential direction and at positions respectively corresponding to the first through hole 132 and the second through hole 133.

The upper-end side valve 136 is made up of a stack of approximately disk-shaped metal plates. A through hole penetrates the center of the stack of metal plates. A shaft 141, described later, of the piston bolt 140 is inserted through the through hole. The upper-end side valve 136 blocks the second through hole 133 and opens the first through hole 132.

The lower-end side valve 137 is made up of a stack of approximately disk-shaped metal plates. A through hole penetrates the center of the stack of metal plates. The shaft 141, described later, of the piston bolt 140 is inserted through the through hole. The lower-end side valve 137 blocks the first through hole 132 and opens the second through hole 133.

The piston bolt 140 includes the shaft 141 and a base 142. The shaft 141 is disposed at the upper end side of the piston bolt 140 and has a solid cylindrical shape. The base 142 is disposed at the lower end side of the piston bolt 140 and has a solid cylindrical shape of larger radius than the radius of the shaft 141. In the piston bolt 140, a depression 143 is formed over the depth from the lower-side end surface of the base 142 to the shaft 141.

The shaft 141 has a male thread formed at the upper-side end of the shaft 141. The male thread is screwed on a female thread formed on the nut 145.

The depression 143 has a female thread formed on the inner surface at the lower-side end of the depression 143. The female thread receives a male thread formed on the upper-side end of the rod 150. At the upper-side end of the depression 143, a radial through hole 144 is formed. The radial through hole 144 radially penetrates the depression 143 to allow the depression 143 to communicate with the outside of the shaft 141.

On the upper-side end of the nut 145, a female thread 146 is formed. The female thread 146 receives a male thread of the piston bolt 140. Under the female thread 146, a depression 147 is formed. The depression 147 is depressed over a depth from the lower-side end surface of the nut 145, and has a solid cylindrical shape of larger radius than the radius of the root of the female thread 146. In the nut 145, a radial through hole 148 is formed. The radial through hole 148 radially penetrates the nut 145 to allow the outside of the nut 145 to communicate with the depression 147.

With the configuration described hereinbefore, the attenuation force generation unit 130 is held on the rod 150 with the male thread on the upper-side end of the rod 150 screwed on the female thread on the depression 143 of the piston bolt 140. The piston 131 is in contact with the inner surface of the cylinder 230 through the seal member on the outer surface of the piston 131. Thus, the piston 131 defines a first oil chamber 51 and a second oil chamber 52 in the space inside the cylinder 230. The first oil chamber 51 is upper than the piston 131, and the second oil chamber 52 is lower than the piston 131.

Configuration of Rod 150

The rod 150 is a hollow cylindrical member, and has male threads at the upper-side end and the lower-side end on the outer surface of the rod 150. The male thread on the upper-side end of the rod 150 is screwed on the piston bolt 140 of the attenuation force generation unit 130. The male thread on the lower-side end of the rod 150 is screwed on a female thread 161*d*. The female thread 161*d* is formed on an upper-end-side solid cylindrical portion 161. The upper-end-side solid cylindrical portion 161 is disposed at the upper end side of the rod holding member 160. A lock nut 155 is screwed on the male thread on the lower-side end of the rod 150. Thus, the rod 150 is secured on the rod holding member 160.

The rod 150 also has a female thread formed on the inner surface of the rod 150 at the lower-side end of the rod 150.

Configuration of Rod Holding Member 160

The rod holding member 160 has a plurality of solid cylindrical portions of different diameters. Namely, the rod holding member 160 includes the upper-end-side solid cylindrical portion 161, a lower-end-side solid cylindrical portion 162, and an intermediate solid cylindrical portion 163. The upper-end-side solid cylindrical portion 161 is disposed at the upper-side end of the rod holding member 160. The lower-end-side solid cylindrical portion 162 is disposed at the lower-side end of the rod holding member 160. The intermediate solid cylindrical portion 163 is disposed between the upper-end-side solid cylindrical portion 161 and the lower-end-side solid cylindrical portion 162.

The upper-end-side solid cylindrical portion 161 has the axial depression 161*a*, a radial depression 161*b*, and a radial through hole 161*c*. The axial depression 161*a* is depressed over a depth in the axial direction from the upper-side end surface of the upper-end-side solid cylindrical portion 161. The radial depression 161*b* is depressed radially throughout the circumference of the upper-end-side solid cylindrical portion 161 over a depth from the outer surface of the upper-end-side solid cylindrical portion 161. The radial through hole 161*c* penetrates the axial depression 161*a* and the radial depression 161*b* in a radial direction.

The axial depression 161*a* has the female thread 161*d*, which receives the male thread on the lower-side end of the rod 150. The axial depression 161*a* also has an inclined surface 161*e*. The inclined surface 161*e* is inclined relative to the axial direction, that is, the inner diameter of the inclined surface 161*e* gradually decreases in the lower side direction.

On the lower-side end of the upper-end-side solid cylindrical portion 161, a male thread 161*f* is formed. The male thread 161*f* is screwed on a female thread formed on the support-member holding member 180, described later.

The intermediate solid cylindrical portion 163 has a diameter smaller than the inner diameter of the axial through hole 112*a* of the outer member 110. Thus, the intermediate solid cylindrical portion 163 is fitted in the axial through hole 112*a* of the outer member 110.

On the outer surface of the lower-end-side solid cylindrical portion 162, a male thread 162*a* is formed.

The rod holding member 160 is secured on the outer member 110 with the male thread 162*a*, which is on the lower-end-side solid cylindrical portion 162, screwed on a nut 165. The nut 165 is inserted through the axial through hole 112*a* of the outer member 110.

Configuration of Restriction Member 167

The regulation member 167 is a stepped, hollow cylindrical member. The regulation member 167 has a male thread formed on the outer surface at the upper-side end of the regulation member 167. The regulation member 167 is secured on the rod 150 with the male thread screwed on the female thread on the inner surface at the lower-side end of the rod 150. The regulation member 167, at its lower-side end, regulates the movement of the ball 166, which is disposed in the axial depression 161*a* of the rod holding member 160.

Configuration of Spring Support Member 170

The spring support member 170 is a hollow cylindrical member, and is secured on the upper-side end of the support-member holding member 180. Examples of the method of securing the spring support member 170 include, but are not limited to, welding and press fitting.

Configuration of Support-Member Holding Member 180

The support-member holding member 180 is a hollow cylindrical member. At the lower-side end of the support-member holding member 180, a female thread 181 is formed. The female thread 181 receives the male thread 162*a*, which is formed on the rod holding member 160. The support-member holding member 180 is secured on the rod holding member 160 with the female thread 181 receiving the male thread 162*a*, which is formed on the rod holding member 160. The support-member holding member 180 has a communication hole 182. The communication hole 182 is formed at a position axially corresponding to the radial depression 161*b* of the rod holding member 160, and thus communicates the inside and outside of the support-member holding member 180 with each other.

Configuration of Guide Member 190

The guide member 190 includes a hollow cylindrical portion 191 and an internally facing portion 192. The hollow cylindrical portion 191 has a hollow cylindrical shape. The internally facing portion 192 radially internally extends from the lower-side end of the hollow cylindrical portion 191.

The guide member 190 is secured between the rod holding member 160 and the outer member 110 with the internally facing portion 192 held between the rod holding member 160 and the outer member 110.

The internally facing portion 192 is chamfered at the lower-side end of the internally facing portion 192. An O ring 195 is fitted in the space defined between the chamfered portion and the rod holding member 160. The O ring 195 seals the gap between the guide member 190, the rod holding member 160, and the outer member 110. Thus, the O ring 195 keeps the space inside the hollow cylindrical portion 111 of the outer member 110 liquid tight.

In the axle side unit 100 with the configuration described hereinbefore, a reservoir chamber 40 is defined between the inner surface of the outer member 110 and the outer surfaces of the rod 150 and the support-member holding member 180. The reservoir chamber 40 stores oil kept hermetic in the front fork 21.

Configuration of Body Side Unit 200

The body side unit 200 includes the inner tube 210 and a cap 220. The inner tube 210 has a hollow cylindrical shape with open ends. The cap 220 is mounted on the upper-side end of the inner tube 210.

The body side unit 200 also includes the cylinder 230 and a hermetic member 240. The cylinder 230 has a hollow cylindrical shape. The hermetic member 240 is mounted on the lower-side end of the cylinder 230, and keeps the space inside the cylinder 230 hermetic.

The body side unit 200 also includes a spring length adjustment unit 250 and the passage switch unit 300. The spring length adjustment unit 250 supports the spring 500 at its upper-side end and adjusts the length of the spring 500. The passage switch unit 300 is mounted on the upper-side end of the cylinder 230 and selects a passage for oil, which is a non-limiting example of operation fluid.

Configuration of Inner Tube 210

The inner tube 210 is a hollow cylindrical member.

The inner tube 210, at its lower-side end, includes a slide bush 211 and a movement regulation member 212. The slide bush 211 has a hollow cylindrical shape and smoothens the sliding contact between the inner tube 210 and the inner surface of the hollow cylindrical portion 111 of the outer member 110. The movement regulation member 212 has a hollow cylindrical shape and is in contact with the spring support member 170 and the axle bracket 112 of the outer member 110. Thus, the movement regulation member 212 regulates axial movement of the inner tube 210.

On the upper-side end of the inner tube 210, a female thread 213 is formed. The female thread 213 receives a male thread formed on the cap 220, described later.

Configuration of Cap 220

The cap 220 is an approximately hollow cylindrical member. On the outer surface of the cap 220, a male thread 221 is formed. The male thread 221 is screwed on the female thread 213, which is formed on the inner tube 210. On the inner surface of the cap 220, a female thread is formed that receives male threads on the spring length adjustment unit 250 and the passage switch unit 300. The cap 220 is mounted on the inner tube 210 and holds the spring length adjustment unit 250 and the passage switch unit 300.

The cap 220 includes an O ring 222. The O ring 222 keeps the space inside the inner tube 210 liquid tight.

Configuration of Cylinder 230

The cylinder 230 is a hollow cylindrical member. On the outer surface at the upper-side end of the cylinder 230, a female thread is formed that receives the male thread on the passage switch unit 300. On the inner surface at the lower-side end of the cylinder 230, a female thread is formed that receives a male thread on the hermetic member 240.

Configuration of Hermetic Member 240

The hermetic member 240 is a hollow cylindrical member. On the outer surface of the hermetic member 240, a male thread is formed that is screwed on the female thread on the inner surface at the lower-side end of the cylinder 230. The hermetic member 240 is held on the cylinder 230 with the male thread screwed on the female thread on the inner surface at the lower-side end of the cylinder 230.

The hermetic member 240 includes a slide bush 245 on the inner circumference side of the hermetic member 240. The slide bush 245 smoothens the sliding contact between the hermetic member 240 and the outer surface of the rod 150. In order to keep the space inside the cylinder 230 liquid tight, the hermetic member 240 includes an O ring 246 and an O ring 247. The O ring 246 is disposed between the hermetic member 240 and the outer surface of the rod 150. The O ring 247 is disposed between the hermetic member 240 and the inner surface of the cylinder 230.

The hermetic member 240 also includes an impact alleviation member 248 at the upper-side end of the hermetic member 240. The impact alleviation member 248 alleviates the impact of contact between the hermetic member 240 and the attenuation force generation unit 130. A non-limiting example of the impact alleviation member 248 is an elastic member such as resin and rubber.

Configuration of Spring Length Changing Unit 250

The spring length adjustment unit 250 includes a base member 260 and an upper-side end support member 270. The base member 260 is secured on the cap 220. The upper-side end support member 270 supports the spring 500 at its upper-side end, and is movable in the axial direction relative to the base member 260. Thus, the upper-side end support member 270 adjusts the length of the spring 500. The upper-side end support member 270 is made of a conductor such as aluminum. The upper-side end support member 270 functions as the tubular vehicle-wheel-side member. Specifically, the upper-side end support member 270 is positioned on the rear wheel 3 side and coupled to the base member 260. The upper-side end support member 270 is movable in the vertical direction of the base member 260 relative to the base member 260.

The base member 260 is an approximately hollow cylindrical member. On the outer surface at the upper-side end of the base member 260, a male thread 260a is formed. The male thread 260a is screwed on the female thread on the cap 220. The base member 260 is secured on the cap 220 with the male thread 260a screwed on the female thread on the cap 220. The base member 260 functions as the tubular vehicle-body-side member, which is disposed at the side of the body of the vehicle. The base member 260 includes a coil 260c. The coil 260c is molded in the base member 260 and constitutes the stroke sensor system. The coil 260c will be detailed later.

The base member 260 has a protrusion 260b at the upper-side end of the base member 260. The protrusion 260b is a radially protruding part of the circumference of the base member 260. In the protrusion 260b, a discharge passage 41 is disposed for the oil in the cylinder 230 to be discharged into the reservoir chamber 40.

The base member 260, at its lower-side end, includes a slide bush 261 and an O ring 262. The slide bush 261 has a hollow cylindrical shape fitted in the outer circumference of the base member 260, and smoothens the sliding contact between the base member 260 and the inner surface of the upper-side end support member 270. The O ring 262 is radially inner than the slide bush 261. A ring-shaped passage 61 is defined between the inner surface of the base member 260 and the outer surface of the cylinder 230. The ring-shaped passage 61 has a ring shape.

The upper-side end support member 270 includes a hollow cylindrical portion 271 and an internally facing portion 272. The hollow cylindrical portion 271 has a hollow cylindrical shape. The internally facing portion 272 radially internally extends from the lower-side end of the hollow cylindrical portion 271. The upper-side end support member 270 defines a jack chamber 60 in the space defined between the outer surface of the cylinder 230 and the lower-side end of the base member 260. The jack chamber 60 stores oil for use in adjusting the position of the upper-side end support member 270 relative to the base member 260.

The hollow cylindrical portion 271 has an inner diameter equal to or smaller than the outer diameter of the slide bush 261, which is fitted in the base member 260. The hollow cylindrical portion 271 has a radial through hole 273. The radial through hole 273 radially penetrates the hollow cylindrical portion 271 and thus communicates the inside and outside of the hollow cylindrical portion 271 with each other. Through the radial through hole 273, the oil in the jack chamber 60 is discharged into the reservoir chamber 40. In this manner, the displacement of the upper-side end support member 270 relative to the base member 260 is regulated.

The internally facing portion 272 includes an O ring 274 on the inner circumference side of the internally facing portion 272. The O ring 274 seals the gap between the internally facing portion 272 and the outer surface of the cylinder 230, and thus keeps the jack chamber 60 liquid tight.

The jack chamber 60 is supplied the oil in the cylinder 230 through the ring-shaped passage 61, which is defined between the inner surface of the base member 260 and the outer surface of the cylinder 230.

Configuration of Passage Switch Unit 300

The passage switch unit 300 adjusts the amount of current through a coil 311 of the solenoid 310. In this manner, at the time of a compression stroke of the front fork 21, described later, the passage switch unit 300 selects a passage for oil from among a first switch state, a second switch state, and a third switch state. In the first switch state, the oil flows out of the first oil chamber 51, passes through the passage switch unit 300, passes through the discharge passage 41, and flows into the reservoir chamber 40. In the second switch state, the oil flows out of the first oil chamber 51, passes through the passage switch unit 300, passes through the ring-shaped passage 61, and flows into the jack chamber 60. In the third switch state, the oil flows out of the jack chamber 60, passes through the passage switch unit 300, passes through the discharge passage 41, and flows into the reservoir chamber 40.

Operation of Front Forks 21

With the configuration of the front fork 21 described hereinbefore, the spring 500 supports the weight of the motorcycle 1 and thus absorbs impact. The attenuation force generation unit 130 attenuates the vibration in the spring 500.

Figure 7:
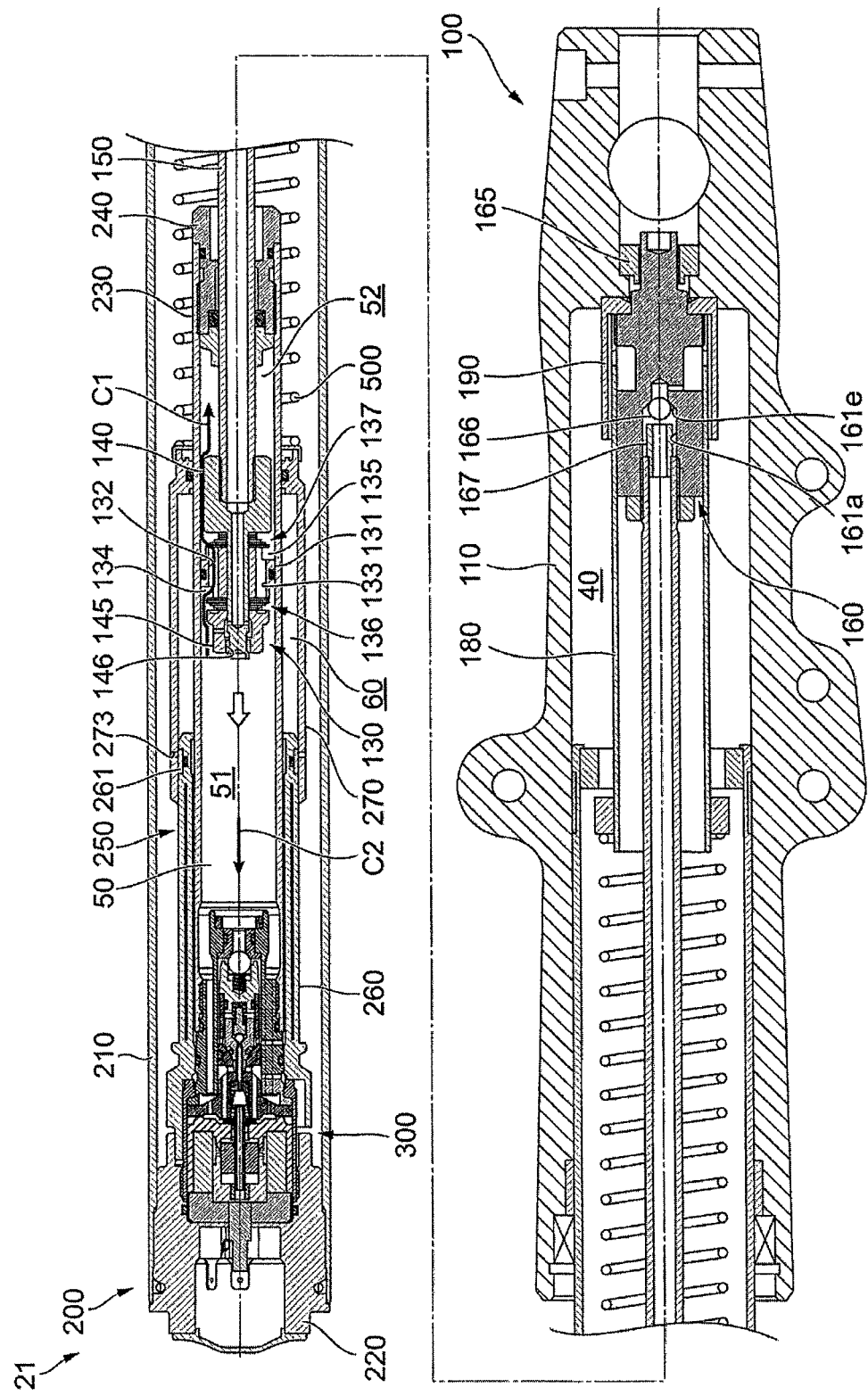
FIG. 7 illustrates how the front fork operates at the time of a compression stroke.

FIG. 7 illustrates how the front fork 21 operates at the time of a compression stroke.

In the compression stroke of the front fork 21, the piston 131 of the attenuation force generation unit 130 moves in the upper-side direction relative to the cylinder 230 as indicated by the outlined arrow. The movement of the piston 131 causes the oil in the first oil chamber 51 to be pressurized. This causes the lower-end side valve 137 covering the first through hole 132 to open and the oil to flow into the second oil chamber 52 through the first through hole 132 (see arrow C1). The oil flow from the first oil chamber 51 to the second oil chamber 52 is narrowed through the first through hole 132 and the lower-end side valve 137. This causes attenuation force for the compression stroke to be generated.

At the time of the compression stroke, the rod 150 enters the cylinder 230. The entry causes an amount of oil corresponding to the volume of the rod 150 in the cylinder 230 to be supplied to the jack chamber 60 or the reservoir chamber 40, which depends on the switch state selected by the passage switch unit 300 (see arrow C2). Here, the attenuation force generation unit 130, the rod 150, the cylinder 230, and other elements function as a pump to supply the oil in the cylinder 230 to the jack chamber 60 or the reservoir chamber 40. In the following description, this pump will occasionally be referred to as "pump P".

Figure 8:
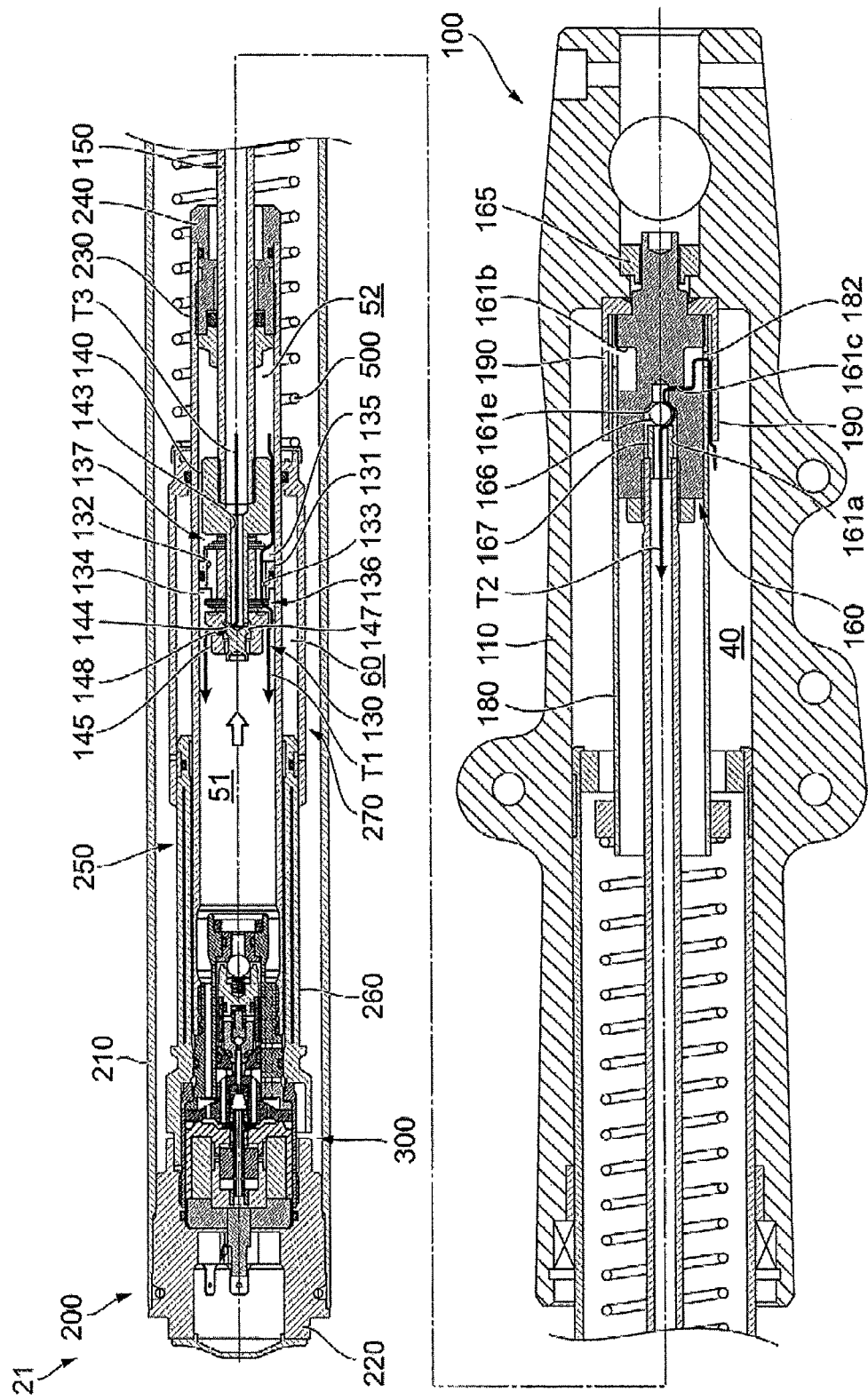
FIG. 8 illustrates how the front fork operates at the time of a rebound stroke.

FIG. 8 illustrates how the front fork 21 operates at the time of a rebound stroke. In the rebound stroke of the front fork 21, the piston 131 of the attenuation force generation unit 130 moves in the lower-side direction relative to the cylinder 230 as indicated by the outlined arrow. The movement of the piston 131 causes the oil in the second oil chamber 52 to be pressurized. This causes the upper-end side valve 136 covering the second through hole 133 to open and the oil to flow into the first oil chamber 51 through the second through hole 133 (see arrow T1). The oil flow from the second oil chamber 52 to the first oil chamber 51 is narrowed through the first through hole 132 and the upper-end side valve 136. This causes attenuation force for the rebound stroke to be generated.

At the time of the rebound stroke, the rod 150 withdraws from the cylinder 230. The withdrawal causes an amount of oil corresponding to the volume of the rod 150 that has been in the cylinder 230 to be supplied from the reservoir chamber 40 to the first oil chamber 51. That is, the movement of the piston 131 in the lower-side direction causes the first oil chamber 51 to be depressurized and the oil in the reservoir chamber 40 to enter the first oil chamber 51. Specifically, the oil in the reservoir chamber 40 passes through the communication hole 182 of the support-member holding member 180 and the radial through hole 161c of the rod holding member 160, and enters the axial depression 161a of the rod holding member 160. Then, the oil moves the ball 166 in the upper-side direction and enters the rod 150 (see arrow T2). In the rod 150, the oil passes through the depression 143 of the piston bolt 140, the radial through hole 144, and the radial through hole 148 of the nut 145, and reaches the first oil chamber 51 (see arrow T3).

Thus, the communication hole 182 of the support-member holding member 180, the radial through hole 161c of the rod holding member 160, the axial depression 161a of the rod holding member 160, the inside of the rod 150, the depression 143 of the piston bolt 140, the radial through hole 144, the radial through hole 148 of the nut 145 function as intake passages through which oil is taken from the reservoir chamber 40 into the cylinder 230 (first oil chamber 51). The ball 166 and the inclined surface 161e, which is formed on the axial depression 161a of the rod holding member 160, function as a check valve that allows oil to flow from the reservoir chamber 40 into the inside of the rod 150 and that restricts discharge of the oil from the inside of the rod 150 to the reservoir chamber 40. The ball 166 and the inclined surface 161e will be referred to as "intake-side check valve Vc".

Up-and-Down of Vehicle Height

In the front fork 21 operating in the above-described manner, when the passage switch unit 300 is in the second switch state, the oil discharged from the pump P at the time of the compression stroke flows into the jack chamber 60, increasing the amount of oil in the jack chamber 60. The increase in the amount of oil in the jack chamber 60 causes the upper-side end support member 270 to move in the lower-side direction relative to the base member 260 of the spring length adjustment unit 250. The movement of the upper-side end support member 270 in the lower-side direction relative to the base member 260 causes the spring length of the spring 500 to shorten. The shortened spring length of the spring 500 causes the spring force of the spring 500 in pressing the upper-side end support member 270 to increase as compared with the spring force before the movement of the upper-side end support member 270 relative to the base member 260. This causes a change in preset load, which is an amount of load that keeps the position of the body frame 11 unchanged relative to the position of the front wheel 2 even when force acts from the body frame 11 toward the front wheel 2 side. In this case, the amount of depression of the front fork 21 is smaller when an amount of force acts in the axial direction from the body frame 11 (seat 19) side. Thus, when the spring length of the spring 500 is shortened due to the movement of the upper-side end support member 270 relative to the base member 260, the height of the seat 19 increases as compared with the height of the seat 19 before the movement of the upper-side end support member 270 relative to the base member 260 (that is, the vehicle height increases).

When the passage switch unit 300 is in the third switch state, the amount of oil in the jack chamber 60 decreases. The decrease in the amount of oil causes the upper-side end support member 270 to move in the upper-side direction relative to the base member 260 of the spring length adjustment unit 250. The movement of the upper-side end support member 270 in the upper-side direction relative to the base member 260 causes the spring length of the spring 500 to increase. The increased spring length of the spring 500 causes the spring force of the spring 500 in pressing the upper-side end support member 270 to reduce as compared with the spring force before the movement of the upper-side end support member 270 relative to the base member 260. This causes the preset load to decrease, and the amount of depression of the front fork 21 is larger when the same amount of force acts in the axial direction from the body frame 11 (seat 19) side. Thus, when the spring length of the spring 500 is increased due to the movement of the upper-side end support member 270 in the upper-side direction relative to the base member 260, the height of the seat 19 decreases as compared with the height of the seat 19 before the movement of the upper-side end support member 270 relative to the base member 260 (that is, the vehicle height decreases).

When the passage switch unit 300 is in the first switch state, the oil discharged from the pump P at the time of the compression stroke flows into the reservoir chamber 40, and thus the amount of oil in the jack chamber 60 does not increase or decrease. Thus, the height of the seat 19 is maintained (that is, the vehicle height is maintained).

Stroke Sensor System

The motorcycle 1 according to this embodiment detects the amount of stroke of each of the rear suspensions 22. Detecting the amount of stroke ensures keeping track of how each rear suspension 22 is operating. It is also possible to differentiate the amount of stroke and utilize the resulting stroke velocity. The motorcycle 1 according to this embodiment also detects the amount of stroke of the spring length adjustment unit 250, in each of the front forks 21.

In this embodiment, a stroke sensor system is used to detect the amount of stroke of the rear suspension 22 and the amount of stroke of the spring length adjustment unit 250.

Figure 9:
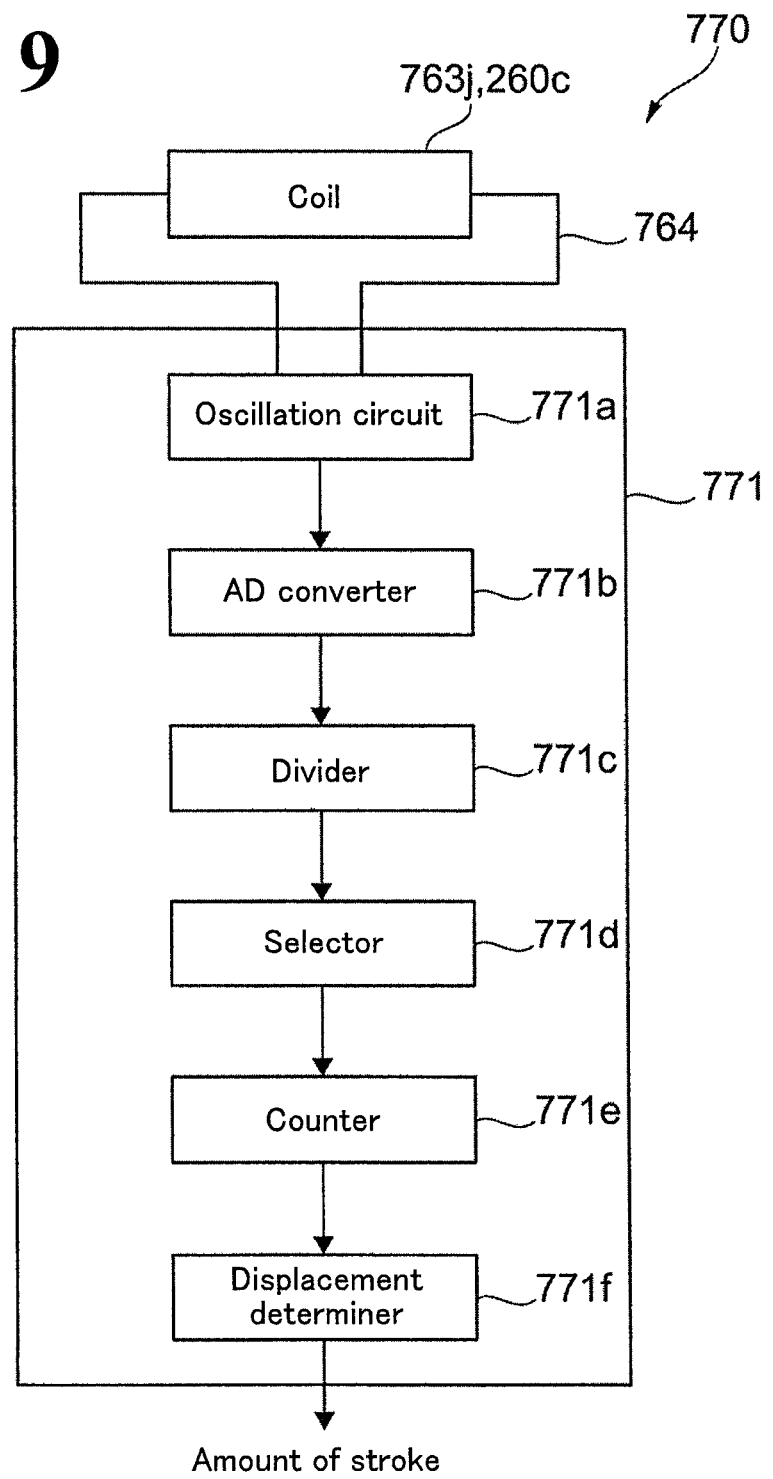
FIG. 9 is a block diagram illustrating a configuration of a stroke sensor system according to the embodiment.

FIG. 9 is a block diagram illustrating a configuration of a stroke sensor system 770 according to this embodiment.

As illustrated in FIG. 9, the stroke sensor system 770 includes the coil 763j (coil 260c) and a displacement obtainer 771. The displacement obtainer 771 obtains the displacement by which the outer cylinder 712 (upper-side end support member 270) and the guide 763c (base member 260) move relative to each other.

The displacement obtainer 771 includes an oscillation circuit 771a, an AD converter 771b, a divider 771c, a selector 771d, a counter 771e, and a displacement determiner 771f. A non-limiting example of the displacement obtainer 771 is the controller 20 and implemented by an ECU (Electronic Control Unit) and other elements.

The oscillation circuit 771a, which will be detailed later, includes a capacitor that is electrically coupled to the coil 763j (coil 260c) and that constitutes an LC oscillation circuit. The LC oscillation circuit outputs AC current of a predetermined resonance frequency. In this embodiment, the resonance frequency varies depending on the amount of stroke of the rear suspension 22 and/or the amount of stroke of the upper-side end support member 270.

Figure 10:
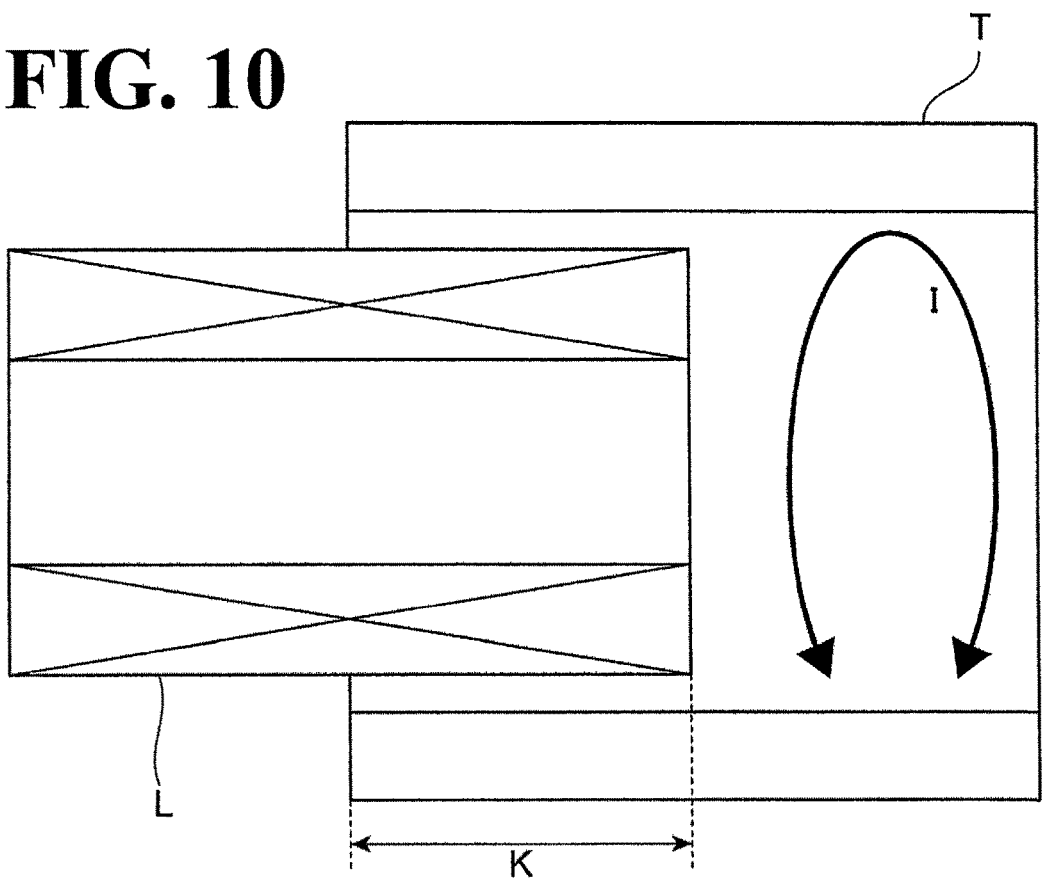
FIG. 10 illustrates the amount of stroke of the rear suspension or a spring length adjustment unit according to the embodiment in relation to resonance frequency.

FIG. 10 illustrates the amount of stroke of the rear suspension 22 or the spring length adjustment unit 250 according to this embodiment in relation to resonance frequency.

Referring to FIG. 10, a hollow cylindrical conductor T and a coil L are fitted with each other over a fitting length (overlapping length) of K. The conductor T corresponds to the outer cylinder 712 (upper-side end support member 270), which is made of aluminum. The coil L corresponds to the coil 763j (coil 260c). The fitting length K corresponds to the length over which the outer cylinder 712 (upper-side end support member 270) and the coil 763j (coil 260c) overlap in the vertical direction. As seen from FIGS. 3 and 10, the positional relationship between the conductor T and the coil L as to which one of the conductor T and the coil L is inside or outside the other is opposite to the positional relationship between the outer cylinder 712 and the coil 763j as to which one of the outer cylinder 712 and the coil 763j is inside or outside the other. This difference, however, has no or minimal influence on the following description.

The fitting length K changes in accordance with the amount of stroke of the rear suspension 22 and/or the amount of stroke of the spring length adjustment unit 250. Specifically, the fitting length K decreases when the rear suspension 22 and/or the spring length adjustment unit 250 extend, while when the rear suspension 22 and/or the spring length adjustment unit 250 contract, the fitting length K increases.

When AC current is allowed to flow through the coil L, eddy current I occurs in the conductor T to cancel change in magnetic field. The eddy current I operates to diminish the magnetic field around the coil L. That is, the eddy current I apparently diminishes the inductance of the coil L. When the fitting length K is shorter (that is, when the rear suspension 22 and/or the spring length adjustment unit 250 extend), the eddy current I has less of an influence on the inductance of the coil L, which is, therefore, higher in this case. When the fitting length K is longer (that is, when the rear suspension 22 and/or the spring length adjustment unit 250 contract), the eddy current I has more of an influence on the inductance of the coil L, which is, therefore, smaller in this case.

The resonance frequency of the LC oscillation circuit changes in accordance with change in the inductance of the coil L. Specifically, the resonance frequency is represented by $f_0 = 1/(2\pi\sqrt{(LC)})$, where $f_0$ denotes the resonance frequency, L denotes the coil inductance, and C denotes the capacitance of the capacitor. That is, when the inductance of the coil L is higher, the resonance frequency decreases, while when the inductance of the coil L is smaller, the resonance frequency increases. Thus, the amount of stroke of the rear suspension 22 and the amount of stroke of the spring length adjustment unit 250 can be obtained based on the resonance frequency.

In this embodiment, the resonance frequency is in a non-limiting range of 30 kHz (at which the rear suspension 22 and the spring length adjustment unit 250 are at their maximum lengths) to 60 kHz (at which the rear suspension 22 and the spring length adjustment unit 250 are at their minimal lengths). Thus, the maximum resonance frequency is approximately twice the minimal resonance frequency.

Figure 11A:
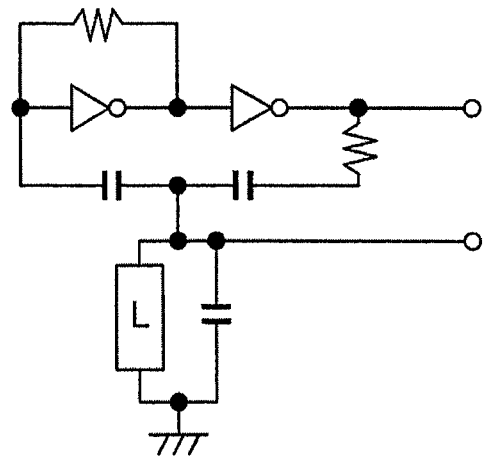
FIGS. 11A, 11B and 11C illustrate exemplary LC oscillation circuits applicable in an oscillation circuit.
Figure 11B:
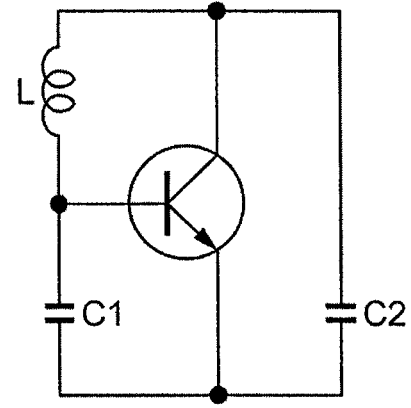
Figure 11C:
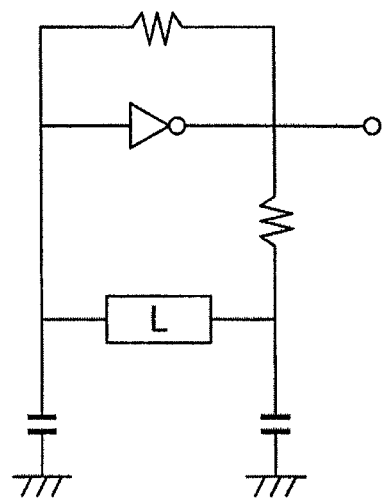

A non-limiting example of the LC oscillation circuit usable in the oscillation circuit 771a is a Franklin oscillator that uses an inverter as illustrated in FIG. 11A. It is noted, however, that the Franklin oscillator should not be construed in a limiting sense; any of other various oscillators is possible insofar as the oscillator is capable of LC oscillation. Other possible examples of the LC oscillation circuit include a Colpitts oscillator of the type illustrated in FIG. 11B and a Colpitts oscillator of the type that uses an inverter as illustrated in FIG. 11C.

Referring back to FIG. 9, the AD converter 771b reshapes the oscillation waveform of an analogue signal output from the oscillation circuit 771a so as to obtain a reshaped waveform of a digital signal. The AD converter 771b is a comparator that converts an analogue signal into a 1-bit digital signal.

The divider 771c divides a frequency of the waveform of the signal digitized at the AD converter 771b so as to obtain a frequency-divided waveform.

Figure 12A:
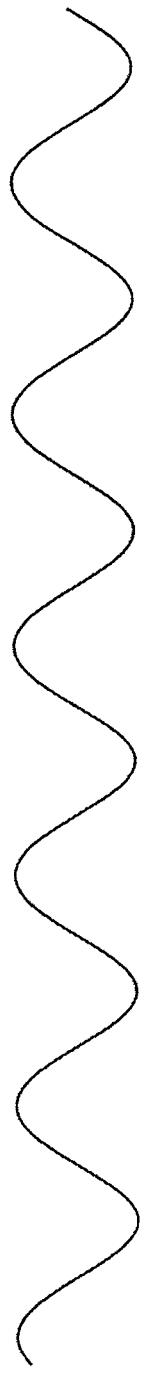
FIG. 12A illustrates an oscillation waveform output from the oscillation circuit.
Figure 12B:
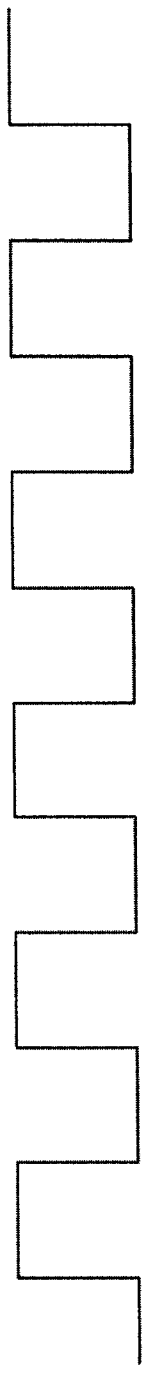
FIG. 12B illustrates a reshaped waveform resulting from the oscillation waveform reshaped at an AD (Analogue-to-Digital) converter.
Figure 12C:
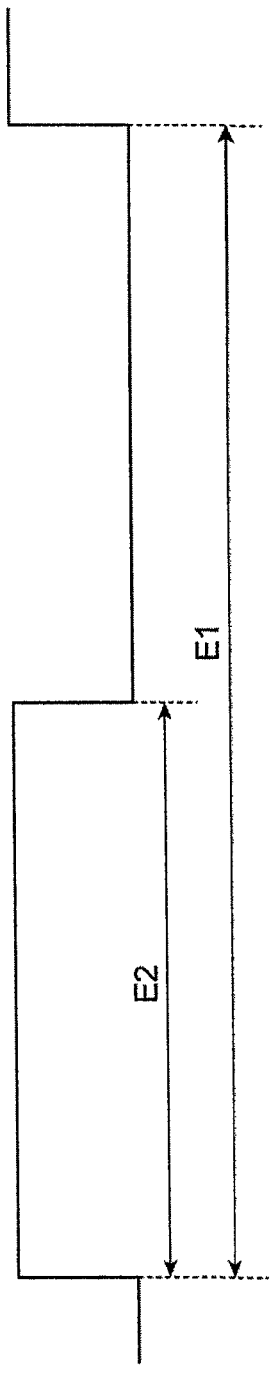
FIG. 12C illustrates a frequency-divided waveform resulting from the reshaped waveform frequency-divided by a divider.

FIG. 12A illustrates the oscillation waveform output from the oscillation circuit 771a. FIG. 12B illustrates the reshaped waveform resulting from the oscillation waveform reshaped at the AD converter 771b. FIG. 12C illustrates the frequency-divided waveform resulting from the reshaped waveform frequency-divided by the divider 771c.

As illustrated in FIG. 12B, the reshaped waveform has the same frequency as the frequency of the oscillation waveform. The sine wave of the oscillation waveform is reshaped into a rectangular wave. As illustrated in FIG. 12C, the frequency-divided waveform remains rectangular, and has a lower frequency because of the division.

The divider 771c uses four frequency division ratios, for example, to frequency-divide the reshaped waveform, and outputs the resulting four frequency-divided waveforms. The frequency division ratios are represented by, for example, $2^n$ (n is an integer) and selected from 1 to 4096. In this embodiment, the frequency division ratios selected are 32 ($=2^5$), 64 ($=2^6$), 128 ($=2^7$), and 256 ($=2^8$).

Examples of the AD converter 771b and the divider 771c include, but are not limited to, binary counters.

The selector 771d selects one frequency-divided waveform from among the four frequency-divided waveforms output by the divider 771c.

The selection of a frequency-divided waveform at the selector 771d keeps the frequency of the frequency-divided waveform within a comparatively narrow range, even if the frequency of the oscillation waveform output from the oscillation circuit 771a changes widely enough to widen the dynamic range.

Additionally, the responsivity of the stroke sensor becomes less likely to vary. Specifically, at a higher frequency, the counter 771e, described later, measures the cycles of the frequency-divided waveform more frequently, while at a lower frequency, the counter 771e measures the cycles of the frequency-divided waveform less frequently. This may cause the displacement determiner 771f to output the amount of stroke more frequently or less frequently. As a result, the responsivity of the stroke sensor may vary. In view of this, the selector 771d selects a frequency-divided waveform to minimize the variation of the responsivity of the stroke sensor. Specifically, a predetermined threshold is provided for the cycles of the frequency-divided waveforms, and the selector 771d selects a frequency-divided waveform based on the threshold.

In a non-limiting embodiment, the frequency of the frequency-divided waveform is in the range of approximately 300 Hz to approximately 2000 Hz.

A non-limiting example of the selector 771d is a multiplexer.

The counter 771e counts edge spacings of the frequency-divided waveform selected at the selector 771d using a counter of a crystal oscillator or a similar device. In this manner, the counter 771e measures the cycles of the frequency-divided waveform. A non-limiting example of one edge spacing is E1 illustrated in FIG. 12C. E1 is equivalent to one cycle of the frequency-divided waveform. E1, however, should not be construed in a limiting sense; another possible example is E2, which is half the cycles of the frequency-divided waveform.

Based on the count obtained by the counter 771e, the displacement determiner 771f determines the amount of stroke of the rear suspension 22 and the amount of stroke of the spring length adjustment unit 250. A non-limiting manner of determining the amount of stroke is to prepare a predetermined formula for calculation and substitute the count into the formula for calculation. Another non-limiting manner of determining the amount of stroke is to substitute the count into a map of correspondence between the count and the amount of stroke.

With the configuration detailed hereinbefore, the stroke sensor system 770 uses a digitized signal. The use of a digitized signal eliminates or minimizes degradation of resolution and contamination of noise as compared with the conventional practice to process an analogue signal. As a result, the amount of stroke is kept track of more accurately.

The stroke sensor system 770 selects a frequency-divided waveform (more precisely, selects a frequency division ratio). The selection of a frequency-divided waveform keeps the frequency of the frequency-divided waveform within a comparatively narrow range even if the dynamic range is as wide as described above.

Assume that the counter 771e counts the edge spacings of the frequency-divided waveform in 40 MHz (the count increases by one for every 25 nanoseconds). In this case, when the frequency of the frequency-divided waveform is from 500 Hz to 1000 Hz, the count is from 40000 to 80000. Thus, the amount of stroke is determined on a more meticulous basis, resulting in a significantly higher resolution. In practice, the LC oscillation circuit may have jitter, which is a deviation in time of a signal waveform. The jitter, however, can be diminished to $10^{-4}$ or less. When the frequency of the frequency-divided waveform is 500 Hz, the deviation due to the jitter is approximately 100 nanometers (ns), which is equivalent to four of the count. Even in this case, however, a resolution equivalent to approximately 40000/4=10000 is secured. Thus, the resolution remains higher than the conventional resolution. Although jitter may also occur in the crystal oscillator of the counter 771e, the amount of the jitter is as negligible as a few to several orders of magnitude smaller than the amount of the jitter occurring in the LC oscillation circuit. The conventional practice has provided a lower resolution than the resolution provided in this embodiment, and thus found it difficult to keep track of the amount of stroke as meticulously as in this embodiment.

In some cases, it is necessary to replace the coil 763j and the coil 260c. For example, the coil 763j and the coil 260c depend on the shapes of the rear suspension 22 and the front fork 21, and if the rear suspension 22 and the front fork 21 are changed to other forms of different shapes, the coil 763*j* and the coil 260*c* are replaced with other coils corresponding to the changed forms. The replacement coils have different inductances. This also applies in cases where the stroke sensor system according to this embodiment 770 is used in applications other than the rear suspension 22 and the front fork 21.

The conventional practice is to replace the entire LC oscillation circuit following the replacement of the coil 763*j* and the coil 260*c*. This embodiment, in contrast, readily deals with the replacement of the coil 763*j* and the coil 260*c* by changing the related formula for calculation and other formulae using the displacement determiner 771*f*. In practice, it is possible to change software to operate the displacement determiner 771*f*, in order to deal with the replacement of the coil 763*j* and the coil 260*c*.

The conventional stroke sensors are dominantly of analogue output type, and this type may not necessarily have as wide an effective range (dynamic range) as desired. Hence, it may be difficult to keep track of the amount of stroke in a region wide enough to encompass a region of slower operation of the suspension and a region of faster operation of the suspension. Additionally, the conventional stroke sensors may provide insufficient levels of resolution of the amount of stroke. Furthermore, when the stroke sensor used is of inductance type, if a characteristic of the coil is changed, a need for a change in the circuit configuration may occur. The need for a change in the circuit configuration may increase the production cost of the stroke sensor.

In a non-limiting embodiment, the displacement obtainer may be configured to determine the frequency division ratio based on a frequency of the oscillation waveform output from the LC oscillation circuit and based on a time period for a cycle of the frequency-divided waveform.

In a non-limiting embodiment, the displacement obtainer may be configured to obtain the displacement based on an edge spacing count of the frequency-divided waveform.

In a non-limiting embodiment, the vehicle-wheel-side member may accommodate the coil and may include a protrusion protruding in a direction orthogonal to the axial direction. The coil may be electrically coupled to the displacement obtainer through the protrusion.

In a non-limiting embodiment, the stroke sensor system may further include an elastic member configured to absorb a vibration between the body and the wheel. The protrusion may be engaged with a cutout portion of a reception member to transmit a force acting from the elastic member.

In a non-limiting embodiment, the protrusion may be a connector.

The embodiments provide a stroke sensor system and a related machine, apparatus, and/or device that facilitate widening of the dynamic range, provide higher levels of resolution, and facilitate dealing with change in coil characteristics.

Obviously, numerous modifications and variations of the present invention are possible in light of the above teachings. It is therefore to be understood that within the scope of the appended claims, the invention may be practiced otherwise than as specifically described herein.

What is claimed is:

1. A stroke sensor system comprising:
   a tubular vehicle-body-side member disposed at a side of a body of a vehicle;
   a tubular vehicle-wheel-side member coupled to the vehicle-body-side member at a side of a wheel of the vehicle and movable in an axial direction of the vehicle-body-side member relative to the vehicle-body-side member, at least one member among the vehicle-body-side member and the vehicle-wheel-side member comprising a conductor, another member among the vehicle-body-side member and the vehicle-wheel-side member comprising a coil; and
   a displacement obtainer comprising a capacitor that is electrically coupled to the coil and that constitutes an LC oscillation circuit configured to output an oscillation waveform when the vehicle-wheel-side member moves relative to the vehicle-body-side member, the displacement obtainer being configured to digitize the oscillation waveform so as to obtain a reshaped waveform, configured to divide a frequency of the reshaped waveform by a predetermined frequency division ratio so as to obtain a frequency-divided waveform, and configured to use the frequency-divided waveform to obtain a displacement by which the vehicle-wheel-side member moves relative to the vehicle-body-side member, wherein
   the displacement obtainer is configured to determine the frequency division ratio based on a frequency of the oscillation waveform output from the LC oscillation circuit and a time period for a cycle of the frequency-divided waveform.

2. The stroke sensor system according to claim 1, wherein the displacement obtainer is configured to obtain the displacement based on an edge spacing count of the frequency-divided waveform.

3. The stroke sensor system according to claim 1,
   wherein the vehicle-wheel-side member accommodates the coil and comprises a protrusion protruding in a direction orthogonal to the axial direction, and
   wherein the coil is electrically coupled to the displacement obtainer through the protrusion.

4. The stroke sensor system according to claim 3 further comprising an elastic member configured to absorb a vibration between the body and the wheel,
   wherein the protrusion is engaged with a cutout portion of a reception member provided to transmit a force acting from the elastic member.

5. The stroke sensor system according to claim 3, wherein the protrusion comprises a connector.

6. The stroke sensor system according to claim 1,
   wherein the vehicle-wheel-side member accommodates the coil and comprises a protrusion protruding in a direction orthogonal to the axial direction, and
   wherein the coil is electrically coupled to the displacement obtainer through the protrusion.

7. The stroke sensor system according to claim 2,
   wherein the vehicle-wheel-side member accommodates the coil and comprises a protrusion protruding in a direction orthogonal to the axial direction, and
   wherein the coil is electrically coupled to the displacement obtainer through the protrusion.

8. The stroke sensor system according to claim 6, further comprising an elastic member configured to absorb a vibration between the body and the wheel,
   wherein the protrusion is engaged with a cutout portion of a reception member provided to transmit a force acting from the elastic member.

9. The stroke sensor system according to claim 7, further comprising an elastic member configured to absorb a vibration between the body and the wheel,
   wherein the protrusion is engaged with a cutout portion of a reception member provided to transmit a force acting from the elastic member.

10. The stroke sensor system according to claim 4, wherein the protrusion comprises a connector.

11. The stroke sensor system according to claim 8, wherein the protrusion comprises a connector.

12. The stroke sensor system according to claim 9, wherein the protrusion comprises a connector.

13. The stroke sensor system according to claim 1, further comprising a cylinder, wherein
the tubular vehicle-body-side member is an outer cylinder that is disposed at an outside of the cylinder and
the tubular vehicle-wheel-side member is a guide that is positioned on a rear wheel side of the vehicle.

14. The stroke sensor system according to claim 1, the frequency-divided waveform is obtained directly after the reshaped waveform is obtained.

* * * * *